US010090983B2

United States Patent
Siomina et al.

(10) Patent No.: US 10,090,983 B2
(45) Date of Patent: *Oct. 2, 2018

(54) SYSTEMS AND METHODS FOR CONFIGURING REDUNDANT TRANSMISSIONS IN A WIRELESS NETWORK

(71) Applicant: TELEFONAKTIEBOLAGET L M ERICSSON (PUBL), Stockholm (SE)

(72) Inventors: Iana Siomina, Täby (SE); Shaohua Li, Beijing (CN); Muhammad Kazmi, Bromma (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,655

(22) Filed: Oct. 31, 2016

(65) Prior Publication Data

US 2017/0048051 A1 Feb. 16, 2017

Related U.S. Application Data

(63) Continuation of application No. 14/385,368, filed as application No. PCT/IB2013/052118 on Mar. 16, 2013, now Pat. No. 9,485,062.

(51) Int. Cl.
*H04W 72/00* (2009.01)
*H04L 5/00* (2006.01)
*H04L 1/18* (2006.01)

(52) U.S. Cl.
CPC ............ *H04L 5/0055* (2013.01); *H04L 1/189* (2013.01); *H04L 1/1825* (2013.01)

(58) Field of Classification Search
None
See application file for complete search history.

(56) References Cited

U.S. PATENT DOCUMENTS 7,912,011 B2 3/2011 Tanno et al.
9,485,062 B2 * 11/2016 Siomina ................ H04L 1/1854
(Continued)

FOREIGN PATENT DOCUMENTS

EP 2383923 A1 11/2011
JP 2011-519535 A 7/2011
(Continued)

OTHER PUBLICATIONS

Ericsson et al: "Demodulation test setup for MBSFN ABS configuration", 3GPP Draft; R4-122924, 3rd Generation Partnership Project (3GPP), Mobile Competence Centre ; 650, Route Des Lucioles ; F-06921 Sophia-Antipolis Cedex; France, val. RAN WG4, No. Prague, Czech; May 21, 2012-May 25, 2012, May 14, 2012 (May 14, 2012), XP050614157.
(Continued)

*Primary Examiner* — Chi H Pham
*Assistant Examiner* — Shick Hom

(57) ABSTRACT

A method for configuring communication in a wireless communication system includes obtaining, at a first network node, information indicating a plurality of candidate subframes for downlink transmissions to a wireless communication device in a first cell served by the first network node. Each candidate subframe satisfies a candidate condition that relates to transmissions in a second cell during that subframe. The method also includes determining, based on the obtained information, a number of copies of an uplink transmission a wireless communication device should transmit in consecutive uplink subframes so that a downlink transmission related to the uplink transmission will occur during one of the candidate subframes. Additionally, the method includes configuring the wireless communication device to transmit the determined number of copies of the uplink transmission in consecutive subframes.

11 Claims, 12 Drawing Sheets

(56) References Cited

U.S. PATENT DOCUMENTS

| | | | |
|---|---|---|---|
| 2006/0094363 | A1 | 5/2006 | Kang et al. |
| 2009/0149221 | A1 | 6/2009 | Liu et al. |
| 2009/0318152 | A1 | 12/2009 | Maheshwari |
| 2011/0075611 | A1 | 3/2011 | Choi |
| 2011/0250919 | A1 | 10/2011 | Barbieri |
| 2011/0317670 | A1 | 12/2011 | Zhang et al. |
| 2012/0113875 | A1 | 5/2012 | Alanara et al. |
| 2013/0021988 | A1* | 1/2013 | Chen ............... H04W 72/1289 370/329 |
| 2013/0130706 | A1* | 5/2013 | Halbauer ............ H04W 72/046 455/450 |

FOREIGN PATENT DOCUMENTS

| | | |
|---|---|---|
| JP | 2013-526154 A | 6/2013 |
| WO | WO 20101048645 A2 | 4/2010 |
| WO | WO 2010/141912 A2 | 12/2010 |
| WO | WO 2011/044946 A1 | 4/2011 |
| WO | 2011/130447 A | 10/2011 |
| WO | WO 2013/080159 A1 | 6/2013 |

OTHER PUBLICATIONS

R4-115130, Further considerations on ABS pattern design, NEC, Zhuhai, Oct. 10-14, 2011.

\* cited by examiner

FIGURE 3

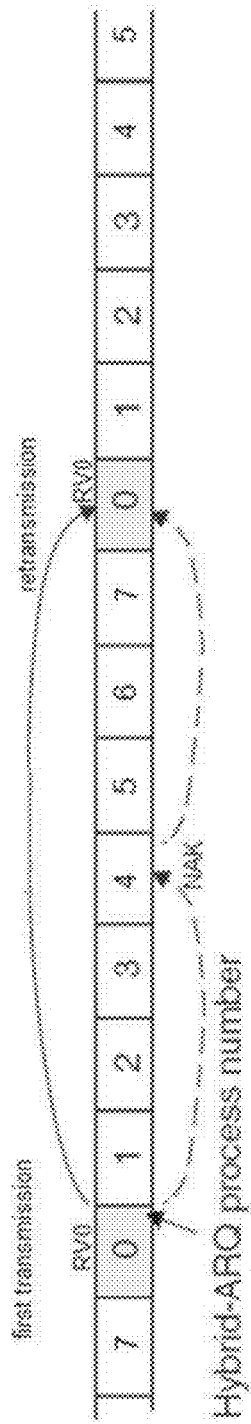
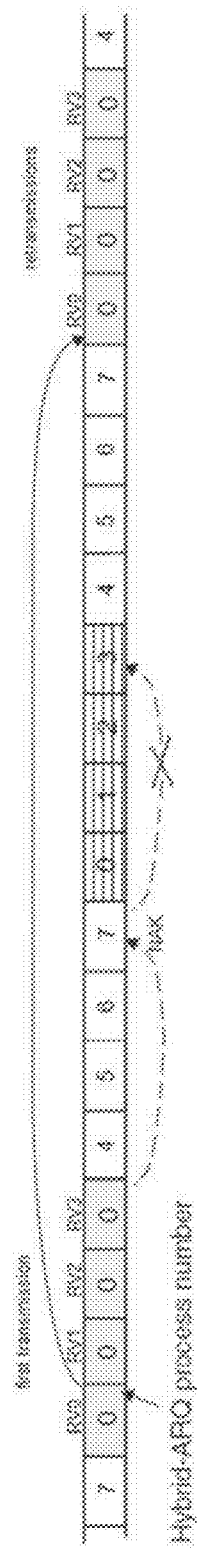
FIGURE 5A
FIGURE 5B

SYSTEMS AND METHODS FOR CONFIGURING REDUNDANT TRANSMISSIONS IN A WIRELESS NETWORK

TECHNICAL FIELD OF THE INVENTION

This disclosure relates in general to wireless communication and, more particularly, to improving the reliability of wireless transmissions.

BACKGROUND OF THE INVENTION

The dramatic increase in the use and availability of communication services in recent years has placed significantly greater demands on wireless communication networks. Continually increasing requirements for coverage, throughput, and reliability have driven many developments in the design and configuration of wireless networks. One example of this has been the development of "heterogeneous" networks in which conventional macro-cell base stations are supplemented by the deployment of various types of "low-power" nodes that provide lower maximum transmission power levels than conventional macro-cell base stations. These low-power nodes are often smaller and cheaper, both to manufacture and to operate, than conventional macro-cell access nodes.

Heterogeneous deployments provide a mechanism for increasing network densities and for adapting to changes in traffic needs and operating environment. However, heterogeneous deployments bring unique challenges that may hinder efficient network operation and degrade user experience. The reduced transmission power typically associated with low-power nodes can result in an increased sensitivity to interference. Additionally, the mix of large and small cells in a heterogeneous deployment can lead to other challenges, as a result of the asymmetric power capabilities of the different cells. As a result, there is a need for effective solutions to reduce inter-cell interference in heterogeneous deployments and other advanced networks.

SUMMARY OF THE INVENTION

In accordance with the present disclosure, certain disadvantages and problems associated with wireless communication have been substantially reduced or eliminated. In particular, certain devices and techniques for providing wireless telecommunication service are described.

In accordance with one embodiment of the present disclosure, a method of configuring communication in a wireless communication system includes obtaining, at a first network node, information indicating a plurality of candidate subframes for downlink transmissions to a wireless communication device in a first cell served by the first network node. Each candidate subframe satisfies a candidate condition that relates to transmissions in a second cell during that subframe. The method also includes determining, based on the obtained information, a number of copies of an uplink transmission a wireless communication device should transmit in consecutive uplink subframes so that a downlink transmission related to the uplink transmission will occur during one of the candidate subframes. Additionally, the method includes configuring the wireless communication device to transmit the determined number of copies of the uplink transmission in consecutive subframes.

In accordance with another embodiment of the present disclosure, a method of configuring communication in a wireless communication system includes obtaining information indicating a first group of one or more subframes of a radio frame in which a first network node will transmit feedback information to one or more wireless communication devices served by the first network node. The method also includes determining, based on the obtained information, a second group of one or more subframes in which a second network node should transmit feedback information to one or more wireless communication devices served by the second network node. The second group of subframes differs from the first group of subframes. The method additionally includes configuring the second network node to transmit feedback information to one or more wireless communication devices during the second group of subframes and transmitting feedback information from the first network node during the second group of subframes.

Important technical advantages provided by certain embodiments of the present disclosure include improved reliability in wireless communications. Particular embodiments may be capable of reducing inter-cell interference experienced by wireless communication devices, especially in heterogeneous networks. Such embodiments may be capable of reducing the number of erroneous transmissions and/or increasing the likelihood that wireless transmissions will be successfully received. Additionally, in particular embodiments, the reduction in interference can be achieved with minimal impact on the throughput of the interfering cell. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 3 is a diagram showing possible MBSFN-configurable subframes according to an example frame configuration;

FIGS. 5A and 5B illustrate example timing for Hybrid-Automatic Repeat reQuest (HARQ) transmissions under various scenarios;

DETAILED DESCRIPTION OF THE INVENTION

Figure 1A:
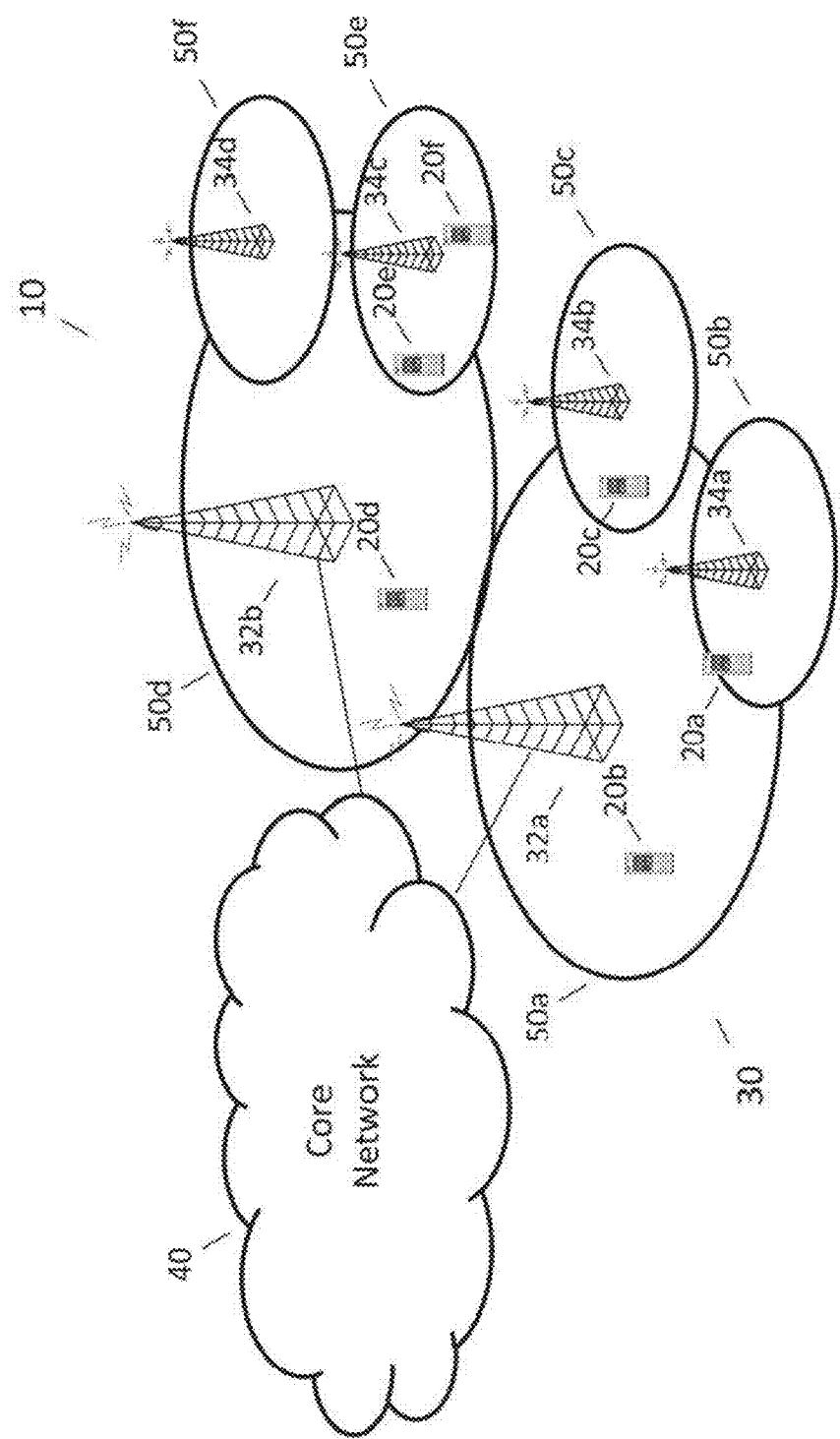
FIGS. 1A-1C illustrate particular embodiments of a wireless communication system in which the described solutions may be implemented.

FIG. 1A illustrates a wireless communication system 10 that provides communication service to one or more wireless communication devices 20. Wireless communication system 10 includes an access network 30 that provides wireless access to communication services within a particular geographic area and a core network 40 that provides backhaul delivery of information within wireless communication system 10. Access network 30 includes multiple radio access nodes including, in certain embodiments, multiple different types of radio access nodes (e.g., both base stations 32 and low-power nodes 34). Each radio access node serves one or more cells 50. Because of the close proximity (and potential overlap) of the cells 50, a wireless communication device 20 operating in a first cell 50 (referred to herein as a "victim cell") may suffer interference due to transmissions occurring in a second cell 50 (referred to herein as an "aggressor cell") that is overlapping or near to the victim cell. This aggressor cell may be served by the same radio access node as the victim cell or by a different radio access node.

Additionally, as noted above, access network 30 may represent a heterogeneous network in which radio access nodes transmitting at different power levels are deployed. This may create more severe interference problems, especially when the victim cell is served by a radio access node using a higher power than the radio access node serving the interfering cell—e.g., for FIG. 1A, in situations in which the victim cell is served by one of low-power nodes 34 and the aggressor cell is served by one of base stations 32.

Figure 1B:
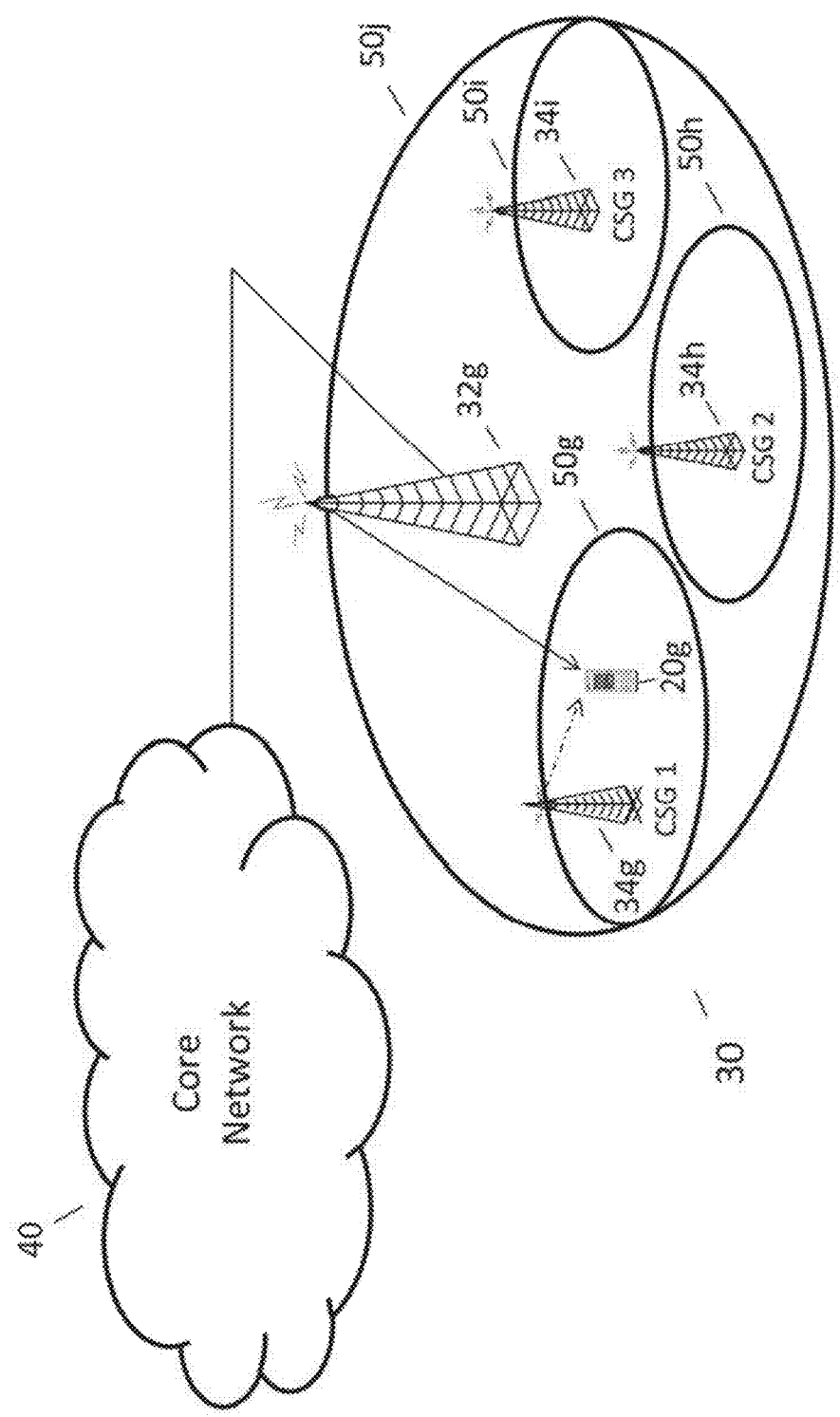

These interference problems may be even further exacerbated by certain solutions that are commonly implemented in heterogeneous networks that utilize certain types of low-power nodes 34. For example, FIG. 1B illustrates problems that may arise in certain embodiments of wireless communication system 10 when one or more low-power nodes 34 are configured to utilize closed subscribed groups (CSGs). In the example of FIG. 1B, one or more low-power nodes 34 are configured to utilize a CSG. The use of CSGs may allow low-power nodes 34 to limit access to their services to certain authorized users that are part of a "closed subscriber group." A radio access node configured with a CSG will provide communication services to wireless communication devices 20 that are members of the CSG, but deny service to wireless communication devices 20 that are not members of that node's CSG. For example, a picocell operated by an employer to provide service for its employees in their workplace could be configured with a CSG that includes the wireless communication devices 20 of all the company's employees. By using the CSG, this low-power node 34 could provide additional or better service coverage to the company's employees beyond that provided by nearby base stations 32 but may still prevent non-employees in the area from tying up the picocell's transmission, reception, or processing resources.

Thus, non-CSG wireless communication devices 20 that are operating in a cell 50 served by a CSG low-power node 34 cannot utilize CSG low-power node 34, even though the CSG low-power node 34 may be the closest radio access node. On the other hand, wireless transmissions made by the CSG low-power node 34 may still interfere with communications between these non-CSG wireless communication devices 20 and other radio access nodes serving them. Moreover, non-CSG wireless communication devices 20 may be located extremely close to the CSG low-power node 34 despite being unable to obtain service from the CSG low-power node 34, which may result in a significant amount of interference for the non-CSG wireless communication devices 20. For instance, in the example shown in FIG. 1B, it is assumed that wireless communication device 20g is not a member of the CSG served by low-power node 34g and cannot obtain service from low-power node 34g. Instead, wireless communication device 20g is served by base station 32g in cell 50j. As a result, cell 34g served by CSG low-power node 34g may act as an aggressor cell while wireless communication device 20 is operating in the portion of cell 50j that overlaps cell 34g. The interference from this aggressor cell 50g may be extremely high wireless communication device 20g is operating very close to low-power node 34g.

Figure 1C:
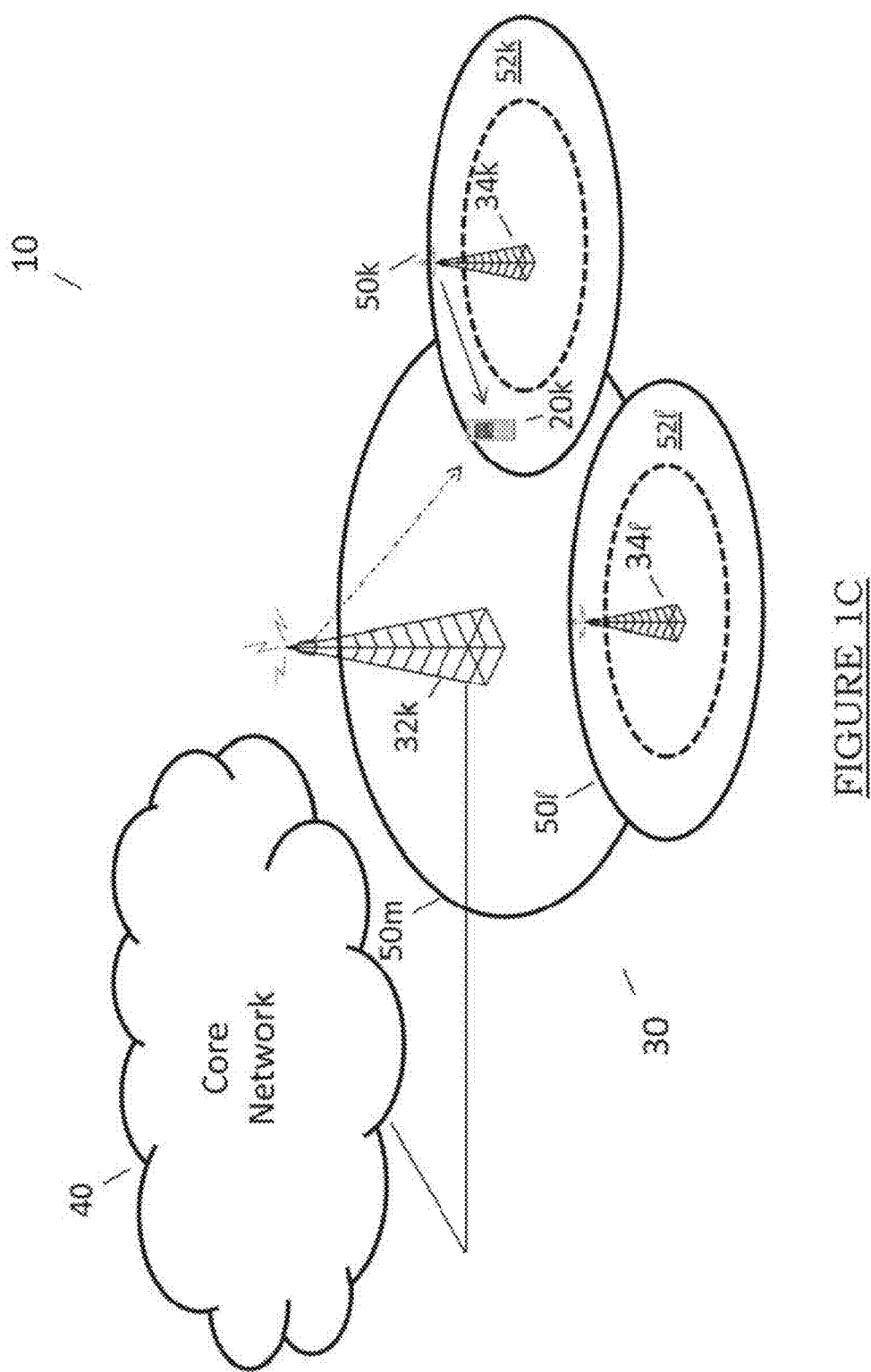

Another interference problem that may arise, especially in heterogeneous networks, relates to the use of "cell range expansion" (or "cell range extension") (CRE) zones. FIG. 1C illustrates an example in which one or more low-power nodes 34 are configured to support CREs. In CREs, cell selection/re-selection diverges from a conventional signal-strength-based (e.g., RSRP-based) approach towards, for example, a pathloss- or pathgain-based approach, thereby extending the coverage of the lower-power cell to include additional areas (represented by CRE zones 52 in FIG. 1C). The larger a particular CRE zone 52 is, the weaker serving cell's signal strength will be near its boundary. This may result in nearby macro cells acting as aggressor cells to wireless communication devices 20 operating in a CRE zone 52. For example, in FIG. 1C, cell 50m served by base station 32k may act as an aggressor cell for wireless communication device 20k operating in CRE zone 52k of low-power node 34k. Thus, in general, as shown by FIGS. 1A-1C inter-cell interference can be a significant concern in wireless communication systems, particularly in those implementing heterogeneous deployments.

It may be critical to protect certain types of signaling from such inter-cell interference. For example, certain embodiments of wireless communication system 10, such as those supporting LTE, may utilize Hybrid-Automatic Repeat reQuest (HARQ) functionalities for transmission error correction. In particular embodiments, HARQ functionality provides an N-process Stop-And-Wait mechanism that transmits and retransmits transport blocks. Upon reception of a transport block, the receiver makes an attempt to decode the transport block and informs the transmitter about the outcome of the decoding operation by transmitting feedback information (e.g., a single-bit acknowledgement (ACK) for successful reception or negative acknowledgement (NAK) for unsuccessful reception) indicating whether the decoding was successful and/or whether a retransmission of the transport block is required. If interference from an aggressor cell prevents feedback information of this type from being successfully transmitted, a significant number of unnecessary retransmissions may occur and/or erroneously received transmissions may never be retransmitted.

Additionally, HARQ may also be used for contention-based random access transmissions, both for a first scheduled uplink transmission (e.g., for initial access, after handover, or upon RRC connection reestablishment) and for contention resolution in downlink (where HARQ feedback is transmitted only by the wireless communication device 20 which detects its own identity, as provided in message 3, echoed in a Contention Resolution message). HARQ failure in the first uplink transmission step or in the contention resolution step may result, for example, in a cell radio network temporary identity (C-RNTI) detection failure by the relevant wireless communication device 20 or erroneous assignment of the same C-RNTI also to another wireless communication device 20.

Certain embodiments of wireless communication system 10 utilize "synchronous HARQ" for some or all of their transmissions. For example, LTE implementations use synchronous HARQ for uplink user data transmissions on the Uplink Shared CHannel (UL-SCH), providing HARQ feedback information in the downlink on a Physical Hybrid-ARQ Indicator CHannel (PHICH). Synchronous HARQ involves synchronous HARQ feedback and synchronous retransmissions. In such embodiments, the time instants for downlink transmissions of feedback information and any uplink retransmissions are fixed based on the subframe(s) scheduled for the uplink transmissions and known to both the radio access node and the relevant wireless communication device 20. Consequently, there may not be any need to signal a HARQ process number when operating in this HARQ mode. The maximum number of retransmissions may be configured per wireless communication device 20. An example of synchronous HARQ operation is shown in FIG. 5A.

In particular embodiments of wireless communication system 10, transmissions in aggressor cells may be constrained by predetermined transmission patterns that limit downlink transmissions made by the radio access nodes serving those cells. These transmission patterns may limit the time and/or frequency resources that are used for making downlink transmissions in the relevant cell. As a result, these transmission patterns may provide a victim cell protection from interference by an aggressor cell in other time and/or frequency resources.

For example, wireless communication system 10 may configure radio access nodes to utilize Almost Blank Subframe (ABS) patterns that result in these radio access nodes transmitting a minimal amount of signaling during certain subframes. In particular embodiments, ABS patterns define low-power and/or low-transmission activity subframes (e.g., subframes in which a reduced number of modulation symbols are transmitted or some other reduction in the amount of data or signaling occurs) for the relevant cell 50. For example, an ABS pattern for a potential aggressor cell may specify a number of subframes during which no user data is transmitted in the aggressor cell, although control channel information may still be transmitted during the relevant subframes. In particular embodiments, ABS patterns may be exchanged between radio access nodes (e.g., via an X2 interface).

Furthermore, in particular embodiments, the inter-cell interference caused by an aggressor cell may be significantly reduced during those ABS subframes that are also configured as Multicast and Broadcast Single Frequency Network (MBSFN) subframes. In certain embodiments, MBSFN subframes are divided into a non-MBSFN region and an MBSFN region. For example, the non-MBSFN region may span the first one or two orthogonal frequency division multiplexing (OFDM) symbols in an MBSFN subframe with the length of the non-MBSFN region being 1 or 2 symbols (e.g., one symbol may be used with 1 or 2 cell-specific ports when the number of DL resource blocks exceeds 10). In such embodiments, the MBSFN region in an MBSFN subframe may then be defined as the OFDM symbols that do not make up part of the non-MBSFN region. While some MBSFN subframes may carry multicast transmissions, such as Physical Multicast Channel (PMCH) transmission, not all MBSFN subframes include such transmissions, despite their name. MBSFN subframes without multicast transmissions are referred to herein as "blank MBSFN subframes."

Figures 2A, 2B:
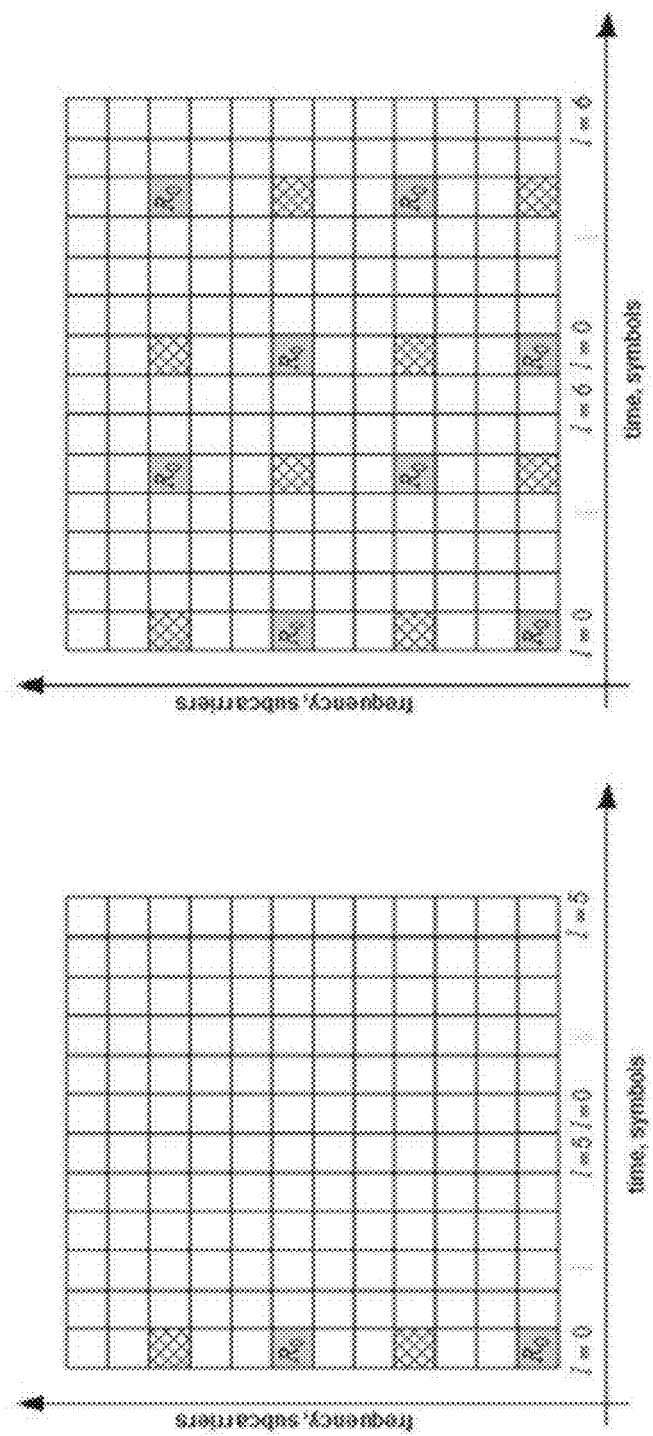
FIGS. 2A and 2B illustrate example transmission patterns for a subframe configured as, respectively, a Multicast and Broadcast Single Frequency Network (MBSFN) Almost Blank Subframe (ABS) subframe and a non-MBSFN ABS subframe.

Nonetheless, even in blank MBSFN subframes, certain types of signaling may still be transmitted in part of the non-MBSFN region. For example, in LTE networks, common reference signals (CRS) may still be transmitted in the non-MBSFN region of the of blank MBSFN subframes, namely in the first symbol. However, unlike ABS configured in non-MBSFN subframes (a "non-MBSFN ABS configuration"), ABS configured in blank MBSFN subframes (an "MBSFN ABS configuration") may result in less inter-cell interference due to the fact that certain information (e.g., CRS in LTE networks) is not transmitted in the MBSFN region of MBSFN subframes. A subframe diagram for an example MBSFN ABS configuration that may be used in particular embodiments of wireless communication system 10 is schematically illustrated in FIG. 2A, while a subframe diagram for an example non-MBSFN ABS configuration that may be used in particular embodiments is schematically illustrated in FIG. 2B. In the examples of FIGS. 2A and 2B, it is assumed that two transmit antenna ports are used for CRS with transmissions shown for the first port (marked with "R0") and the second port (marked with crosshatching). As can be seen from FIGS. 2A and 2B, when a potential aggressor cell is configured with MBSFN ABS, transmissions will occur in fewer symbols per subframe than with non-MBSFN ABS, resulting in less overall interference from an aggressor cell configured with MBSFN ABS.

Figure 3:
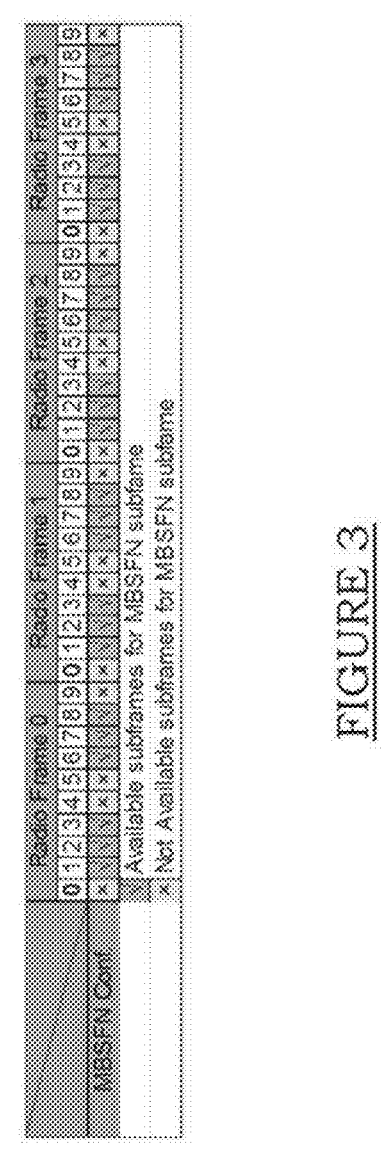

However, not all downlink (DL) subframes may be MBSFN-configurable. FIG. 3 shows an example of how MBSFN configuration is constrained under the 3GPP TS 36.331 specification for Long Term Evolution (LTE) networks when FDD is utilized. As shown in FIG. 3, MBSFN cannot be configured in subframes #0, #4, #5, #9 in an FDD system, since some system information may need to be transmitted in these subframes. Thus, in such embodiments, only subframes #1, #2, #3, #6, #7, and #8 can be configured as MBSFN subframes. By contrast to the FDD constraints shown in FIG. 3, in TDD LTE systems, only subframes #3, #4, #7, #8, and #9 can be configured for MBSFN. While it might be possible to use a mixture of MBSFN and non-MBSFN ABS to protect more subframes, mixing MBSFN and non-MBSFN ABS subframes can produce other problems, such as inaccurate cell state information reports, less efficient demodulation algorithms for wireless communication devices 20 with advanced receivers, unnecessary constraints on network configuration, and reduced throughput in the aggressor cell. Additionally, some of the available MBSFN subframes may need to be used for purposes other than interference cancellation. Thus, wireless communication system 10 may not have enough MBSFN cells available for ABS to protect all the downlink subframes in the victim cell that it is necessary or desirable to protect. This means that MBSFN subframes can only be used to reduce interference at certain times and, in particular embodiments, the time periods that can be protected may change from network to network.

Thus, constraints on how aggressor cell transmission patterns can be configured may make it impossible to protect all the necessary transmission resources in the victim cell from interference using a transmission pattern such as an MBSFN ABS pattern. For example, assume the HARQ timing in a particular embodiment of wireless communication system 10 is based on an 8 ms periodicity, which is consistent with the HARQ periodicity set for LTE. If an uplink grant is first allocated in subframe n, HARQ feedback information (e.g., an ACK/NAK indication) will be sent on the PHICH channel of subframes (n+8k) mod(10), where k is any positive integer value and mod(.) is the modulus after division. When n is an odd number, Subframes 1, 9, 7, 5, and 3 will have ACK/NAK information for the corresponding HARQ process. In this case, although Subframe 9 and 5 would need protection, these subframes would not MBSFN-configurable in the example illustrated by FIG. 3. When n is an even number, downlink HARQ feedback information will be transmitted in Subframes 0, 8, 6, 4, and 2 for the corresponding HARQ process. In this case, Subframes 0 and 4 need protection, but are not MBSFN-configurable either under the example of FIG. 3.

Figure 4:
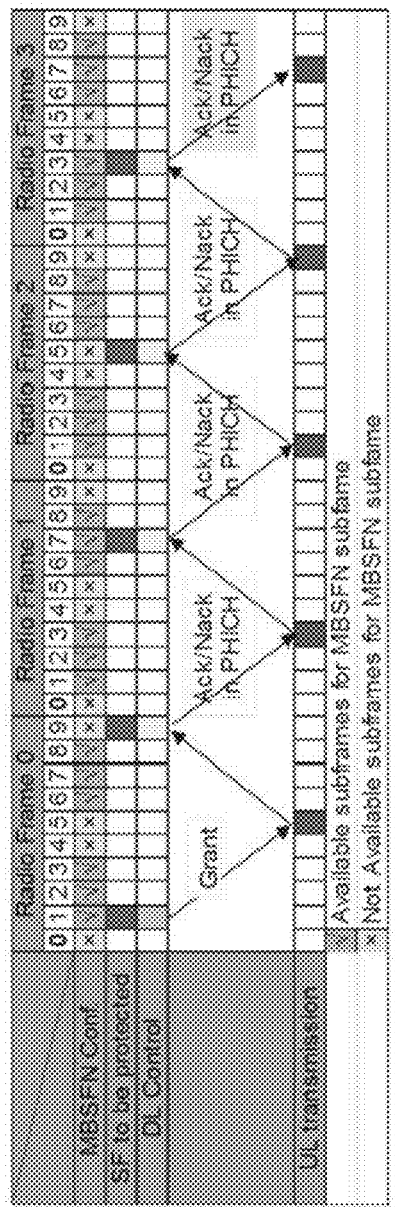
FIG. 4 illustrates example timing for certain downlink transmissions relative to a set of candidate subframes that may be used to protect downlink transmissions.

To illustrate how this may cause problems, FIG. 4 shows an example of the uplink HARQ timing that may occur in an example embodiment of wireless communication system 10 in which a radio access node is attempting to successfully transmit HARQ feedback on a PHCIH in a victim cell. It may be necessary to protect the PHICH transmission in the victim cell with MBSFN ABS subframes or some other mechanism in the aggressor cell if a wireless communication device 20 in the victim cell is going to have any chance of successfully receiving and decoding the PHICH transmissions. In the example of FIG. 4, the subframes in a victim cell that require protection by MBSFN ABS subframes in the aggressor cell are shown in the row labeled "SF to be protected." As FIG. 4 illustrates, under this example configuration, Subframe 9 of Radio Frame 0 and Subframe 5 of Radio Frame 2 cannot be protected with MBSFN ABS subframe, since MBSFN cannot be configured in these subframes in this example. Consequently, only some of the resulting PHICH transmissions can be protected by MBSFN ABS subframes, and without more, some PHICH transmissions will not be detected reliably due to the configuration constraints for MBSFN subframes.

This is an example of a more generic problem that may occur in particular embodiments as a result of a mismatch in the periodicity of the relevant downlink transmissions (e.g., HARQ feedback information transmitted on PHCIH) and that of a transmission pattern (e.g., an MBSFN ABS pattern) that provides appropriate interference conditions to protect downlink transmissions in the victim cell. While it may be possible to protect some of the downlink transmissions in a victim cell by simply taking advantage of a transmission pattern configured for the aggressor cell (e.g., an MBSFN ABS pattern), it may not be possible to protect all downlink transmissions made in the victim cell in this manner. In general, when there is a restriction (e.g., due to subframe type such as MBSFN/non-MBSFN, cyclic prefix configuration, interference conditions, network configuration, device activity state) on the time and/or frequency resources that can be protected from interference by the aggressor cell and at the same time there are pre-determined time occasions when certain downlink transmissions need to occur in the victim cell (e.g., due to the timing constraints of synchronous HARQ), these pre-determined time occasions may not fully encompass all of the subframes that could possibly be needed for downlink transmissions. Therefore, in embodiments of wireless communication system 10 that exhibit a periodicity mismatch between a pattern of subframes that can be interference-protected and the downlink transmissions that require such protection, it may be impossible to protect all downlink transmissions needing protection without additional measures being taken.

As a result, wireless communication system 10 is configured to control the time and/or frequency resources used for certain downlink transmissions in a victim cell to ensure that the relevant downlink transmissions coincide with a pre-defined, feasible subset of "candidate" resources that are or can be interference protected. More specifically, in particular embodiments of wireless communication system 10, a first radio access node may be able to provide interference protection for downlink transmissions in a first cell by exploiting transmission patterns in other cells. The first radio access node may configure certain downlink transmissions on time and/or frequency resources that will experience no inter-cell interference or reduced levels of inter-cell interference. As discussed further below in regards to FIGS. 5A-5B, 6, and 7, one example of how radio access nodes can implement this configuration is by utilizing redundant transmissions in certain uplink transmissions to beneficially adjust the timing of related downlink transmissions. In certain embodiments, radio access nodes in victim cells may implement the described configuration solutions independently, reacting to fixed transmissions patterns used by the aggressor cells. However, in alternative embodiments, radio access nodes in victim cells may instead be capable of interacting with radio access nodes in potential aggressor cells to coordinate transmission patterns, as explained in further detail below with respect to FIGS. 8 and 9.

Returning now to the example embodiment shown in FIG. 1A, the illustrated embodiment of wireless communication system 10 provides wireless communication service to one or more wireless communication devices 20 operating within a plurality of cells 50 served by wireless communication system 10. Wireless communication system 10 may support communication of any suitable type and/or in accordance with any appropriate communication standards including, but not limited to, any Long Term Evolution (LTE), Worldwide Interoperability for Microwave Access (WiMAX), and Wideband Code Division Multiple Access (WCDMA) communication standards.

Wireless communication device 20 represents any device capable of communicating information wirelessly with wireless communication system 10. Examples of wireless communication device 20 include traditional communication devices such as wireless phones, personal digital assistants ("PDAs"), laptop computers, and any other portable communication device suitable for use with communication system 10. For example, in particular embodiments, wireless communication device 20 represents an instance of LTE user equipment (UE). Additionally, in particular embodiments, wireless communication device 20 may also represent automated equipment or devices capable of machine-type communication (MTC). For example, wireless communication device 20 may represent a wireless meter or sensor, a digital billboard, a wireless-capable appliance (e.g., a washing machine, furnace, digital video recorder (DVR)), or any other device capable of wireless communication with access network 30.

Access network 30 communicates wirelessly with wireless communication devices 20 and serves as an interface between wireless communication devices 20 and core network 40. Access network 30 may represent or include a radio access network and/or any elements responsible for providing a radio or air interface for core network 40. Access network 30 includes one or more radio access nodes capable of communicating wirelessly with wireless communication devices 20. In the example embodiment of FIG. 1A, these radio access nodes include a plurality of base stations 32 and low-power nodes 34. Access network 30 may also include base station controllers, access servers, gateways, relays, repeaters, and/or any additional components suitable for managing radio channels used by base station 32, authenticating users, controlling handoffs between base station 32 and other radio access elements, and/or otherwise managing the interoperation of base stations 32 and interfacing base stations 32 with core network 40.

In particular embodiments, access network 30 may represent a heterogeneous network in which multiple different types of radio access nodes are deployed. For example, in the illustrated example of FIG. 1A, access network 30 includes a plurality of base stations 32 that each serve one or more cells 50 and a plurality of low-power nodes 34 that each serve one or more cells. For purposes of this description, cells 50 served by base stations 32 are referred to as "macro" cells, while cells 50 served by low-power stations 34 are referred to as "micro" cells. In particular embodiments, micro-cells served by low-power stations 34 may substantially overlap one or more macro-cells served by nearby base stations 32, as shown in FIG. 1A. Base stations 32 communicate wirelessly with wireless communication devices 20 to facilitate wireless communication service for wireless communication devices 20. Base stations 32 may include any appropriate elements to communicate with wireless communication devices 20 and to interface wireless communication devices 20 with core network 40. For example, depending on the communications standards supported by access network 30 and core network 40, each base station 32 may represent or include a base station, a Node B, an evolved Node B (eNode B), a radio base station (RBS), or any other suitable element capable of communicating with wireless communication devices 20 wirelessly.

Similarly, low-power nodes 34 communicate wirelessly with wireless communication devices 20 to facilitate wireless communication service for wireless communication devices 20. Low-power nodes 34 may also include any appropriate elements to communicate with wireless communication devices 20 and to interface wireless communication devices 20 with core network 40. In particular embodiments, low-power nodes 34 may have a lower maximum transmission power than base stations 32, or may be configured to use lower transmission powers than base stations 32. Examples of low-power nodes 34 include, but are not limited to, pico base stations, femto base stations, micro base stations, home eNodeBs (HeNBs), and wireless local access network (WLAN) access points.

Although referred to as being "low-power," low-power nodes 34 may, in particular embodiments, include identical physical components to base stations 32 but, at a given time, may be simply configured to operate differently from base stations 32. Furthermore, although the description below focuses, for purposes of example, on embodiments in which access network includes radio access nodes that differ in terms of transmission power, other embodiments of access network 30 may include differing types of radio access nodes that differ in regards to other aspects of their operations and/or other capabilities or characteristics. Moreover, alternative embodiments of access network 30 may represent homogeneous networks in which all of the radio access nodes are similar or identical.

Each radio access node in access network 30 is associated with one or more cells 50 that is served by that radio access node. Cells 50 may define an approximate geographical area served by the corresponding radio access node. For purposes of simplicity, FIG. 1A illustrates an example embodiment in which each radio access node is configured to serve a single cell 50. However, in particular embodiments, the radio access nodes may be capable of supporting multiple different cells 50. For example, in embodiments that support carrier aggregation or other multicarrier features, a particular radio access node may serve multiple different cells 50, possibly with identical geographic coverage, with each of the cells 50 served by that radio access node using a carrier from a different portion of the frequency spectrum. As a result, in particular embodiments, a first cell 50 and a second cell 50 may both be served by the same radio access node, and those cells 50 may cover identical, overlapping, or completely distinct geographical areas.

Core network 40 routes voice and/or data communicated by wireless communication devices 20 from access network 30 to other wireless communication devices 20 or to other communication devices coupled to core network 40 through landline connections or through other networks. Core network 40 may support any appropriate standards or techniques for routing such communications. For example, in embodiments of wireless communication devices 20 that support LTE, core network 40 may represent a System Architecture Evolution (SAE) core network. Core network 40 may also be responsible for aggregating communication for longhaul transmission, authenticating users, controlling calls, metering usage for billing purposes, or other functionality associated with providing communication services. In general, however, core network 40 may include any components suitable for routing and otherwise supporting voice and/or data communications for wireless communication devices 20.

In operation, radio access nodes of wireless communication system 10 (such as base stations 32 and low-power nodes 34 in the example embodiment) provide wireless communication service to wireless communication devices 20 operating in the cells 50 served by these radio access nodes. To protect certain downlink transmissions from inter-cell interference, the timing of these downlink transmissions is controlled to ensure that these transmissions occur in certain subframes (referred to herein as "candidate subframes"). These candidate subframes represent subframes in which one or more aggressor cells will have limited or no transmissions, overall interference in the victim cell will be reduced, and/or other desirable transmission conditions will occur for the victim cell.

For example, in particular embodiments, the candidate subframes may represent those subframes, or a specific subset of those subframes, in which an aggressor cell is configured to transmit MBSFN ABS subframes. In particular embodiments, these candidate subframes may represent subframes in which transmissions by base station 32a in the aggressor cell are limited in some way (e.g., the subframes configured as ABS subframes under the ABS configuration), subframes in which low-power node 34a or access network 30 has designated as being acceptable for certain or all interference sensitive operations (e.g., the subframes identified by a restricted measurement pattern configured for wireless communication device 20a), or some combination of the two. Alternatively, in some embodiments, the candidate subframes may depend on an ability of the wireless communication device 20 to handle high-interference associated with transmissions in the aggressor cell and/or a receiver type for a receiver of wireless communication device 20 (e.g., an indication of its ability to handle or mitigate certain types of interference). More generally, the candidate subframes may represent any subframes that satisfy a candidate condition that relates in any suitable manner to transmissions in an aggressor cell during the relevant subframes.

As explained above, in particular embodiments, the timing of the relevant downlink transmissions (e.g., synchronous HARQ transmissions) may be constrained by the timing of related uplink transmissions that have a fixed timing relationship with the relevant downlink transmissions. As a result, wireless communication system 10 may use the timing of the related uplink transmissions to control the timing of the relevant downlink transmissions. In certain embodiments, the downlink transmission to be protected may be triggered by the receipt of the last copy of the associated uplink transmission (or the occurrence of the subframe in which the last copy should have been received). Thus, by intelligently adjusting the number of consecutive copies of the uplink transmission that the wireless communication device 20 transmits, wireless communication system 10 may be able to ensure that the responsive downlink transmission occurs during a protected subframe. More specifically, the radio access nodes in particular embodiments may use transmission redundancy features, such as Transmission Time Interval (TTI) bundling, to control the timing of the related uplink transmission.

TTI bundling allows wireless communication devices 20 to make multiple uplink transmission attempts in consecutive subframes before receiving downlink HARQ feedback. This may result in improved uplink coverage for cell edge wireless communication devices 20 and reduce the HARQ failure probability (e.g., by reducing HARQ signaling). Additionally, the use of transmission redundancy may cause changes in the timing for the responsive downlink HARQ transmissions as the HARQ transmission is triggered by the timing of the last copy. By intelligently adjusting the number of copies of the uplink transmission that are made, the radio access node can control the timing of the responsive downlink HARQ transmission.

FIGS. 5A and 5B illustrate example timing for HARQ signaling without TTI bundling and with TTI bundling, respectively. In the example of FIG. 5B, a wireless communication device 20 transmits a TTI bundle that includes 4 redundancy versions (RVs) transmitted in 4 consecutive TTIs. Note that compared to FIG. 5A, the retransmission of the TTI bundle is delayed, because the shortest HARQ round trip time (RTT) with the bundle size of 4 is 11 ms which cannot be synchronized with the normal HARQ RTT of 8 ms. Thus, a period of 16 ms is configured. The time slots in between can be used for some other transmissions from the relevant wireless communication device 20 or other wireless communication devices 20. As FIGS. 5A and 5B show, through the selective use of TTI bundling or other types of redundant transmissions, radio access nodes can adjust the overall timing of an uplink transmission and, in turn, the timing of a related downlink transmission (e.g., a responsive HARQ transmission). If a radio access node in a victim cell uses this technique to align the relevant downlink transmission with a candidate subframe for a potential aggressor cell, the radio access node can make more effective use of the interference-protected subframes that are available.

For example, returning to FIG. 1A, a first radio access node (in this example, base station 32a) serving an aggressor cell (here, cell 50a) is assumed to interfere with a victim cell (here, cell 50b) served by a second radio access node (here, low-power node 34a). Low-power node 34a may obtain configuration information identifying a plurality of candidate subframes in which low-power node 34a can expect reduced interference from transmissions by base station 32a in the aggressor cell 50a. The configuration information may represent information generated by low-power node 34a itself or by another device. As a result, low-power node 34a may obtain this information, for example, by retrieving the information from local storage or by receiving the information from another element of wireless communication system 10, such as from a coordinating node of access network 30 or from base station 32a itself.

The obtained configuration information may indicate the candidate subframes in any suitable manner, including by explicitly identifying each of the candidate subframes, by providing an identifier for a predetermined group of candidate subframes, or by indicating the relevant subframes in any other suitable manner, explicitly or implicitly. In particular embodiments, the obtained information represents a bitmap providing a bit for each subframe in the configured radio frame. The value of each bit indicates whether or not the corresponding subframe is a candidate subframe with respect to the relevant aggressor cell 50a. Moreover, as noted above, in particular embodiments, the candidate subframes represent all or some of the MBSFN ABS subframes configured for the aggressor cell 50a. Thus the obtained information may be an indication of which subframes are configured as MBSFN ABS subframes, such as an identifier for a predetermined MBSFN ABS pattern.

In particular embodiments, low-power node 34a may use the obtained information to configure a wireless communication device 20 it serves (e.g., wireless communication device 20a) to also take advantage of the transmission pattern of the aggressor cell. This may ensure wireless communication device 20a performs measurements or performs certain other operations under reduced interference conditions. For instance, a radio access node may communicate to a wireless communication device 20 operating in a potential victim cell a time-domain measurement resource restriction pattern or some other form of restricted measurement pattern that indicates the candidate subframes or a subset of those subframes. In particular embodiments, such patterns comprise a bit string indicating restricted (e.g., ABS) and/or unrestricted subframes for one or multiple aggressor cells expected to interfere with the victim cell. These restricted measurement patterns may be used to configure wireless communication devices 20 to perform signal strength measurements or to perform other predetermined operations during subframes with improved interference conditions. The restricted measurement patterns may represent serving-cell patterns for radio link management (RLM) or radio resource management (RRM) measurements, neighbor-cell pattern for RRM measurements, serving-cell pattern for channel state information (CSI) measurements and demodulation, or other types of patterns identifying specific resources appropriate for performing measurements or other operations (e.g., receiving certain downlink transmissions, such as feedback information).

After low-power node 34a has obtained the configuration information indicating the candidate subframes for the aggressor cell, low-power node 34a may use the obtained information to ensure that certain downlink transmissions made by low-power node 34a are scheduled during one of the candidate subframes. When a wireless communication device 20 served by low-power node 34a (here, wireless communication device 20a) requests permission to make an uplink transmission, low-power node 34a may use the obtained information to determine a number of copies of the uplink transmission wireless communication device 20a should make to ensure that a downlink transmission associated with the uplink transmission (for purposes of this example, a responsive HARQ transmission) is made during one of the candidate subframes.

Depending on the implementation of the described solution, low-power node 34a may determine the number of copies to transmit by determining without constraint an appropriate number of copies to be transmitted or by selecting the number from a limited set of possible options (e.g., selecting between "one" and "multiple" copies). For instance, particular embodiments of wireless communication system 10 may support TTI bundling or other redundancy features that, when activated, provide for a fixed and predetermined number of copies to be transmitted by wireless communication device 20a. For example, conventional LTE networks support a fixed TTI bundle size of 4 copies. In such networks, a wireless communication device 20 transmits one copy whenever TTI bundling is not activated and 4 copies whenever TTI bundling is activated. Thus, in particular embodiments, determining the number of copies to be transmitted may represent deciding whether or not to activate TTI bundling, and a fixed number of copies may be transmitted whenever TTI bundling is activated.

In certain embodiments, low-power node 34a may have some scheduling flexibility and may also select the subframe in which wireless communication device 20a is to transmit the initial copy of the uplink transmission. In such embodiments, low-power node 34a may select both the number of copies to be transmitted and the scheduled subframe for the first copy to ensure that the responsive downlink subframe is made during one of the candidate subframes. In other embodiments, the scheduling request transmitted by wireless communication device 20a may pertain to a particular subframe (e.g., the subframe occurring a predetermined amount of time after the scheduling request is received), and low-power node 34a may be required to schedule the first copy during the relevant subframe. As a result, in such embodiments, low-power node 34a is unable to adjust the scheduling of the first copy, but may be able to ensure the related downlink transmission occurs during a candidate subframe solely by adjusting the number of copies of the uplink transmission that are transmitted. After low-power node 34a has determined the appropriate number of copies for wireless communication device 20a to transmit, low-power node 34a may transmit to wireless communication device 20a information indicating that wireless communication device 20a has been scheduled to transmit an uplink transmission. For example, in particular embodiments, low-power node 34a may transmit a scheduling grant that grants wireless communication device 20a use of transmission resources to make the uplink transmission. Along with this scheduling grant, low-power node 34a may transmit additional scheduling information indicating to wireless communication device 20a the determined number of copies of the uplink transmission it should transmit in consecutive subframes. As one example, in particular embodiments, wireless communication system 10 may be able to utilize TTI bundling features to configure a wireless communication device 20 to transmit redundant copies of an uplink transmission and the scheduling information identifies a specific TTI-bundling configuration (e.g., activate/deactivate TTI bundling; use TTI bundling with a particular bundle size). The scheduling information may also configure other aspects of the uplink transmission. For example, low-power node 34a may set a maximum number of retransmissions that wireless communication device 20 should send.

Additionally, low-power node 34a may transmit to base station 32a or the radio access node serving another aggressor cell information indicating the subframes to be protected. The relevant radio access node may adjust a transmission pattern (e.g., an ABS MBSFN pattern) for an aggressor cell to ensure the downlink transmissions in victim cell 50b are protected. Low-power node 34a may also transmit to and receive from other radio access nodes information indicating a capability for using redundant uplink transmissions (e.g., TTI bundling) adaptively to the candidate subframes and/or a capability to simultaneously support redundant uplink transmissions and restricted measurement patterns.

Upon receiving the scheduling grant and any additional scheduling information (e.g., an indication that bundling should be activated, an explicit indication of the determined number of copies), wireless communication device 20a transmits the uplink transmission to low-power node 34a. If the configuration information indicates that wireless communication device 20a should transmit more than one copy of the uplink transmission, wireless communication device 20a repeats the uplink transmission in subsequent subframes until wireless communication device 20a has transmitted the determined number of copies of the uplink transmission in consecutive subframes. For example, in particular embodiments, the scheduling information may indicate that wireless communication device 20a should activate TTI bundling and wireless communication device 20a may transmit a predetermined number of copies of the uplink transmission that has been fixed for TTI bundling within wireless communication system 10.

After wireless communication device 20a completes transmission of the appropriate number of copies of the uplink transmission, low-power node 34a transmits a downlink transmission related to the uplink transmission. As explained above, the associated downlink transmission is related in time to the uplink transmission. Thus, low-power node 34a times the downlink transmission in accordance with the timing relationship between the uplink transmission and its associated downlink transmission. For example, in particular embodiments, the downlink transmission represents a HARQ feedback transmission (e.g., ACK or NAK) that should be transmitted a predetermined number of subframes after the last copy of the uplink transmission is transmitted. Thus, low-power node 34a transmits the HARQ feedback transmission a predetermined number of subframes after receiving the last copy of the uplink transmission (or a predetermined number of subframes after the last copy of the uplink transmission should have been received).

Because the number of copies that wireless communication device 20a would transmit was determined based on the timing of candidate subframes, the downlink transmission will occur during one of the candidate subframes. This means that the candidate subframe receives protection from interference from the aggressor cell 50a corresponding to the candidate subframe, resulting in signal timing similar to FIG. 6. In the illustrated example of FIG. 1A, the relevant candidate subframes relate to the transmissions of base station 32a in the aggressor cell 50a. As a result, the downlink transmission is protected from interference due to transmissions by base station 32a in the aggressor cell 50a. This protection may result in a greater likelihood that wireless communication device 20a will successfully receive the downlink transmission than if the timing of the downlink transmission were left unconstrained.

While the described techniques may be applied unconditionally to protect all downlink transmissions of the relevant types, some embodiments may utilize these techniques only under certain circumstances. Under other circumstances, the number of copies set for the corresponding uplink transmission will be determined using some other default technique, such as the conventional process for activating TTI bundling. For instance, in particular embodiments, the radio access node in a victim cell may determine whether interference conditions warrant applying the techniques described above before doing so. Thus, in such embodiments, the radio access node may adjust the number of copies that are transmitted of a particular uplink transmission in response to determining that a particular interference condition is satisfied. This interference condition may relate in any appropriate manner to the interference experienced by the relevant wireless communication device 20 and/or the victim cell. Additionally, in embodiments that utilize an interference condition, the interference condition may be the same as a candidate condition that defines the group of candidate subframes (or candidate resources).

As one example, radio access nodes may be configured to utilize the above techniques only when interference in a victim cell is determined to be sufficiently great. Thus, in particular embodiments, the interference condition may relate to an interference measurement performed by the radio access node, the relevant wireless communication device 20, or other elements of wireless communication system 10. These interference measurements may represent signal or channel quality estimates, signal strength measurements, channel estimate reports, or any other suitable measurements of interference and/or signal quality in the victim cell. In such embodiments, the radio access node may determine based on one or more interference measurements whether or not to adjust the number of transmitted copies for a particular uplink transmission, as described above, to ensure the transmission is protected.

As another example, wireless communication system 10 may be configured to utilize the above techniques to reduce the impact of CSG radio access nodes on wireless communication devices 20 that do not belong to their subscriber group, such as in the scenario illustrated by FIG. 1B. Thus, the interference condition may relate to whether the relevant wireless communication device 20 (such as wireless communication device 20g in FIG. 1B) is operating in a CSG cell for a closed subscriber group to which the wireless communication device 20g does not belong. In such embodiments, a first radio access node (e.g., base station 32g in FIG. 1B) may determine whether or not to adjust the number of transmitted copies for a particular uplink transmission based on whether wireless communication device 20g is operating within a cell of a second radio access node (e.g., cell 50g served by low-power node 34g) that serves a closed subscriber group to which the wireless communication device 20 does not belong.

As yet another example, wireless communication system 10 may be configured to utilize the above techniques to reduce interference for wireless communication devices 20 operating in cell range expansion zones, such as in the scenario illustrated by FIG. 1C. Thus, in particular embodiments, the interference condition may relate to whether or not the relevant wireless communication device 20 (e.g., wireless communication device 20k in FIG. 1C) is operating in a CRE zone 52 or another area in which the serving radio access node is expected to have reduced signal strength. In such embodiments, a first radio access node (e.g., low-power node 34k in FIG. 1C) may determine whether or not to adjust the number of transmitted copies for a particular uplink transmission based on whether wireless communication device 20k is operating within a CRE cell 52 of that radio access node (e.g., CRE zone 52k). This may result in protection for downlink transmissions in areas, like CRE zones, where the victim cell is weaker and may be more susceptible to interference from an aggressor cell.

In yet other embodiments, the decision of whether or not to use redundant uplink transmissions to facilitate protection of related downlink transmissions may be based on other factors that may or may not be directly related to interference, such as whether the relevant wireless communication device 20 has detected a low-power node 34 nearby, how far the relevant wireless communication device 20 is from its nearest low-power node 34, whether the relevant wireless communication device 20 is capable of supporting redundant transmissions (e.g., TTI bundling capability), whether the relevant wireless communication device 20 has a measurement pattern configured, whether the MBSFN ABS pattern in a particular aggressor cell can be configured to match a round trip time for HARQ in the victim cell without using redundant transmissions, whether redundant transmissions have been requested by another network node (e.g., a self-organizing network (SON), an operations and maintenance (O&M) node, a neighbor radio access node), and/or any other suitable considerations.

Although the description above focuses on specific embodiments that utilize MBSFN ABS subframes of an aggressor cell as the candidate subframes, the candidate subframes may represent subframes that satisfy any suitable predetermined candidate condition. In certain embodiments, this candidate condition may relate to the amount of interference that will occur during the relevant subframe caused by transmissions from one or more other radio access nodes. In particular, the candidate condition may relate to whether or not a specific radio access node or group of radio access nodes is configured to transmit during that subframe. Similarly, although the description above focuses on specific embodiments that focuses on specific types of related uplink and downlink transmissions, the described techniques can be used to protect any downlink transmissions that are related in time to an uplink transmission for which a radio access node can control the redundancy. Thus, transmissions on other downlink control channels, for example, that are triggered by uplink transmissions may also be protected in the described manner.

By selectively using redundant uplink transmissions, particular embodiments of wireless communication system 10 may be able to align certain critical downlink transmissions with protected subframes configured in aggressor cells. This may result in reduced interference and greater reliability in the relevant downlink transmissions and may reduce the overhead resulting from excessive retransmissions. Thus, certain embodiments of wireless communication system 10 may provide numerous operational benefits. Nonetheless, specific individual embodiments of wireless communication system 10 may provide some, none, or all of these benefits.

Figure 6:
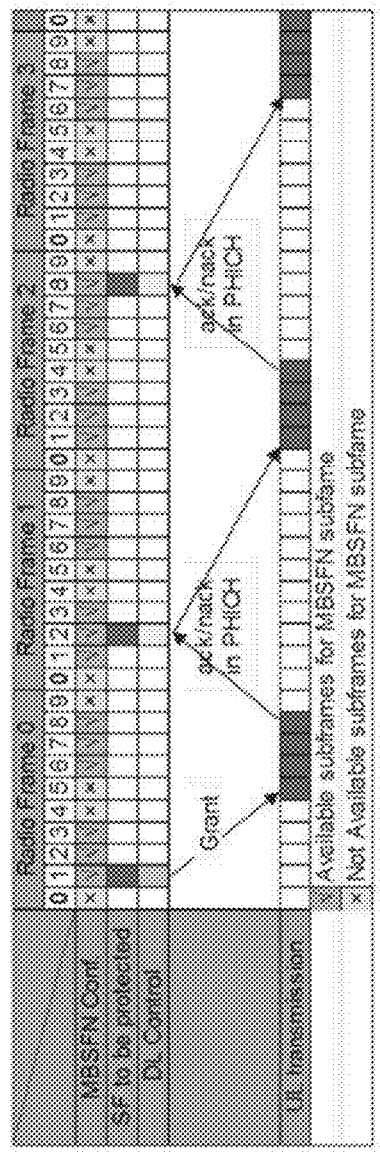
FIG. 6 illustrates another example of the relative timing of the downlink transmissions and candidate subframes from FIG. 4 when multiple copies of a related uplink transmission are made.

FIG. 6 shows an example of how selective redundancy can be used to protect downlink transmissions. More specifically, FIG. 6 illustrates an example embodiment in which a radio access node utilizes TTI bundling to delay HARQ feedback for purposes of aligning HARQ feedback transmissions with a set of candidate subframes. In the example embodiment, a set TTI bundle size of 4 TTI is used and the maximum transmission number is set to 3. With this example configuration, a wireless communication device 20 can be scheduled in the (1,0) subframe, and the feedback information (e.g., ACK/NAK) will be transmitted in the (2,1) and (8,2) subframes, as shown. (Here, (u,v) denotes the uth subframe of the vth radio frame.)

In this example embodiment, the pre-defined feasible subset of candidate time- and/or frequency resources for downlink transmissions include subframes marked as "MBSFN conf." in FIG. 6 (which are MBSFN-configurable subframes in the aggressor cell which may use an MBSFN ABS pattern). The subframes in which low-interference conditions are needed or desirable in the victim cell are marked as "SF to be protected." The subframes in which the downlink transmissions will occur are marked as "DL control," and the subframe for the bundled uplink transmissions triggering those downlink transmissions are marked as "UL transmission" in FIG. 6. (In particular embodiments, only a subset of the candidate subframes are used to protect the DL control transmissions and, in such embodiments, the subframes marked "DL control" may differ from those marked "SF to be protected.") In this example, without using TTI bundling adaptively to MBSFN-configurable subframes, "SF to be protected" would not be a subset of the MBSFN-configurable subframes, which would result in PHICH detection problem and thus HARQ performance issues. A comparison to the example of FIG. 4 shows that, by using transmission redundancy as in FIG. 6, MBSFN ABS subframes can be used to protect downlink transmissions that it would otherwise not be possible to protect in this manner.

Figure 7:
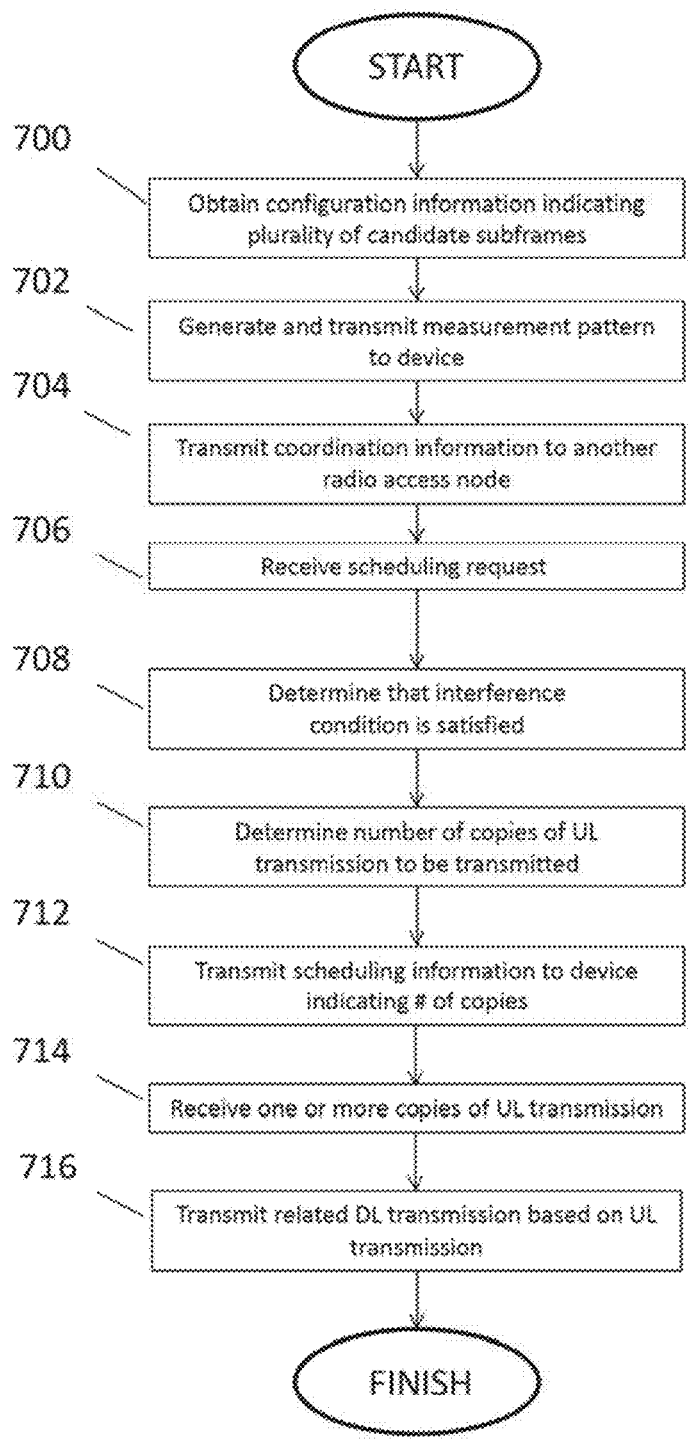
FIG. 7 is a flow chart showing example operation of a particular embodiment of a radio access network node in facilitating the protection of downlink transmissions.

FIG. 7 is a flow chart illustrating example operation for a radio access node, such as one of the base stations 32 or low-power nodes 34 in FIG. 1A, in configuring the use of redundant uplink transmissions to protect related downlink transmissions. The steps illustrated in FIG. 7 may be combined, modified, or deleted where appropriate. Additional steps may also be added to the example operation. Furthermore, the described steps may be performed in any suitable order.

Operation begins in FIG. 7 with a radio access node (in this example, low-power node 34a of FIG. 1A) obtaining configuration information indicating a plurality of candidate subframes for downlink transmissions to a wireless communication device 20 (in this example, wireless communication device 20a) in a first cell at step 700. The candidate subframes represent subframes that satisfy a predetermined candidate condition that relates to transmissions in a second cell during the relevant subframe. In particular embodiments, the candidate condition specifically relates to an amount of interference that will occur during the relevant subframe caused by transmissions in the second cell.

In particular embodiments, low-power node 34a may generate a measurement pattern for wireless communication device 20a based on the candidate subframes associated with the second cell. The measurement pattern may indicate all or a subset subframe of the candidate subframes. Wireless communication device 20a may be configured to perform certain measurements or receive certain transmissions in the subframes indicated by the measurement pattern. Thus, in the illustrated example, low-power node 34a generates a measurement pattern that indicates all the candidate subframes for the second cell and transmits that measurement pattern to wireless communication device 20a, at step 702.

Additionally, low-power node 34a may transmit to another radio access node, such as the radio access node serving the second cell (e.g., base station 32a), information indicating one or more of the candidate subframes that low-power node 34a will use for downlink transmissions, the determined number of copies of the uplink transmission, and/or other information that will allow the other radio access node to coordinate its transmissions to protect the downlink transmissions made by low-power node 34a. Thus, in the illustrated example, low-power node 34a transmits coordination information to base station 32a at step 704. For example, in particular embodiments, the configuration information received by low-power node 34a initially may identify potential protected subframes (e.g., subframes that could be configured for MBSFN ABS). Base station 32a may use the coordination information to determine which of the potential protected subframes actually need to be protected. This may allow wireless communication system 10 to limit how much coordination will constrain the aggressor cell's use of transmission resources.

With the configuration information, low-power node 34a may be able to begin configuring uplink transmissions by wireless communication device 20a based on the configuration information. In particular embodiments, this configuration may be initiated by wireless communication device 20a indicating it has data available for transmission. For example, in the illustrated embodiment, low-power node 34a receives a scheduling request from wireless communication device 20a requesting that low-power node 34a schedule an uplink transmission for wireless communication device 20a, at step 706.

In particular embodiments, radio access nodes of wireless communication system 10 may not attempt to protect its downlink transmissions under all circumstances. Instead, the radio access nodes may only configure wireless communication devices 20 to facilitate protection in certain situations, such as based on the interference the relevant wireless communication device 20 is experiencing or is expected to experience. Thus, in the illustrated example, low-power node 34a determines whether an interference condition is satisfied at step 708. This interference condition may relate to actual interference measurements, to whether wireless communication device 20a is located within a cell serving a CSG to which wireless communication device 20a does not, to whether the wireless communication device 20a is operating within a cell range expansion zone, or to any other consideration that affects the interference or anticipated interference experienced by wireless communication device 20a.

If the interference condition is not satisfied, low-power node 34 may configure wireless communication device 20a to transmit a single copy of the relevant uplink transmission or use conventional techniques to determine whether redundancy should be applied. In the illustrated example, however, it is assumed that the interference condition is satisfied and operation continues to step 710. As noted above, the steps of FIG. 7 may be performed in any suitable order in various embodiments. Thus, although shown as not occurring until step 708 in the illustrated example, the completion any of the preceding steps may, in alternative embodiments, also be conditioned on this determination of whether an interference condition is satisfied.

At step 710, low-power node 34a determines, based on the information regarding the candidate subframes, a number of copies of an uplink transmission that wireless communication device 20a should transmit in consecutive uplink subframes. Specifically, low-power node 34a selects a number of copies that will result in a downlink transmission related to the uplink transmission occurring during one of the candidate subframes. As explained above, depending on the implementation of the described solution, low-power node 34a may determine the number of copies to transmit by determining without constraint an appropriate number of copies to be transmitted or by selecting the number from a limited set of possible options (e.g., selecting between "one" and "multiple" copies). For instance, in particular embodiments, determining the number of copies to be transmitted may represent low-power node 34 deciding whether or not to activate TTI bundling, and a fixed number of copies (e.g., 4 copies) may be transmitted whenever TTI bundling is activated.

At step 712, low-power node 34a then configures the wireless communication device 20a to transmit the determined number of copies of the uplink transmission in consecutive subframes. In particular embodiments, low-power node 34a configures wireless communication device 20a to transmit the determined number of copies of the uplink transmission by transmitting scheduling information or other types of instructions to wireless communication device 20a indicating directly or indirectly the number of copies of the uplink transmission to transmit. In particular embodiments, this scheduling information may explicitly specify the number of copies wireless communication device 20a should transmit. As noted above, in particular embodiments, rather than explicitly specifying a number of copies, this configuration information may indicate whether or not wireless communication device 20a should activate TTI bundling or some other form of redundancy under which wireless communication device 20a transmits a fixed number of copies.

Once wireless communication device 20a receives the scheduling information indicating the number of copies of the uplink transmission to transmit or is otherwise configured by low-power node 34a to transmit the appropriate number of copies, wireless communication device 20 may perform the relevant uplink transmission. In doing so, wireless communication device 20a transmits, in consecutive subframes, the number of copies of the uplink transmission determined by low-power node 34a. Thus, at step 714, low-power node 34a receives one or more copies of an uplink transmission transmitted by wireless communication device 20a.

In particular embodiments, low-power node 34a transmits a downlink transmission related to the uplink transmission with a timing that satisfies a predetermined relationship to the timing of the uplink transmission. For example, low-power node 34a may transmit feedback information (e.g., HARQ feedback comprising an ACK/NACK bit). In certain embodiments, the timing relationship results in the downlink transmission occurring in a subframe that is a fixed number of subframes after the last copy of the uplink transmission is received or is scheduled to be received. Consequently, in the illustrated embodiment, low-power node 34a transmits the downlink transmission a predetermined amount of time after a last of the one or more copies is received, at step 716. Because of the manner in which low-power node 34a determined the number of copies of the uplink transmission to be transmitted, the subframe occurring the predetermined amount of time after the last copy is received is one of the candidate subframes. Thus, the downlink transmission made by low-power node 34 occurs during a candidate subframe, and the downlink transmission is protected from the interference of the second cell as a result. Operation of low-power node 34a with respect to configuring the relevant uplink transmission may then end as shown in FIG. 7.

Figure 8:
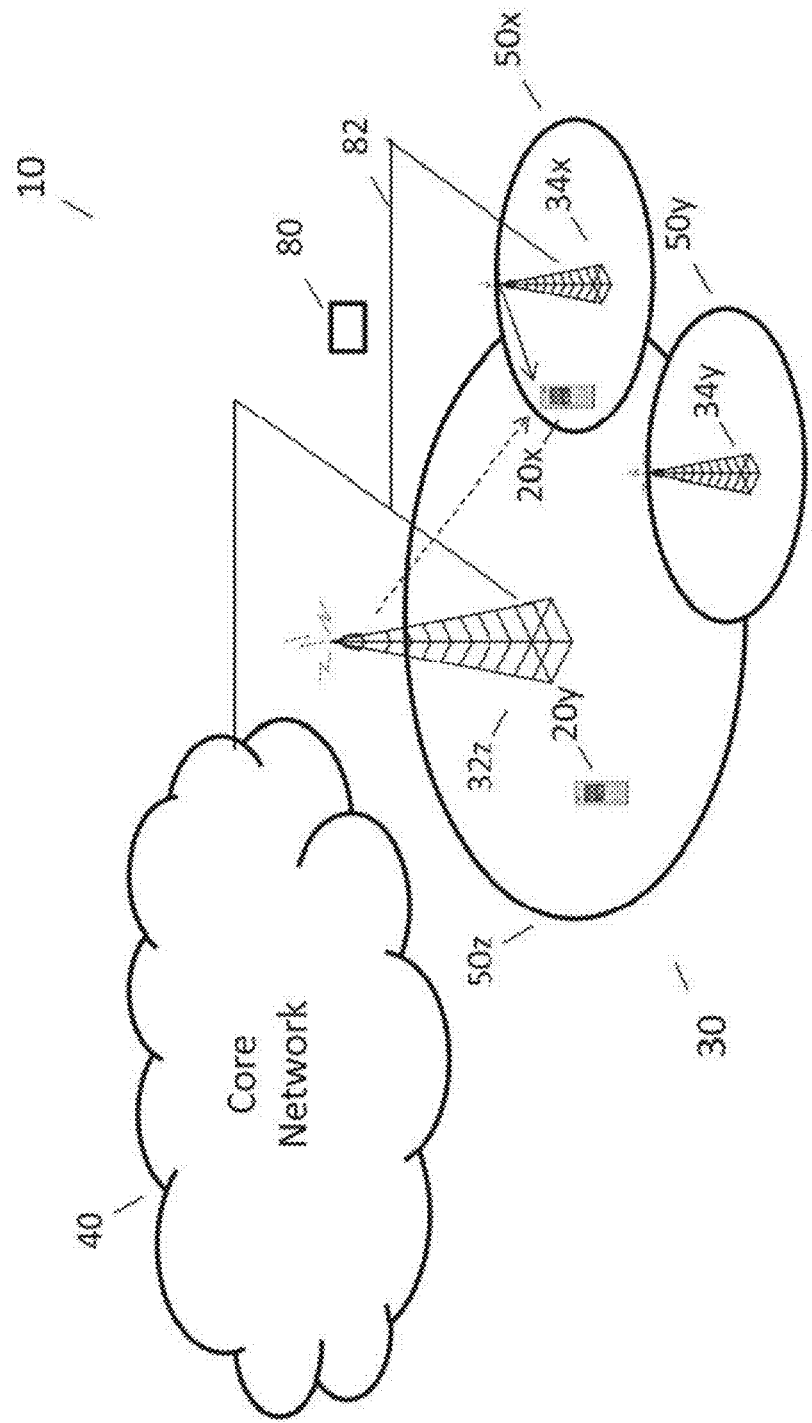
FIG. 8 illustrates another embodiment of the example wireless communication system from FIGS. 1A-1C in which radio access network nodes coordinate their operation to provide protection for downlink transmissions.

In addition to or as an alternative to using redundant uplink transmissions to facilitate protection of downlink transmissions, wireless communication system 10 may utilize other forms of coordination between its radio access nodes to partially or fully protect downlink transmissions in potential victim cells from interference by potential aggressor cells. FIG. 8 illustrates an example embodiment of wireless communication system 10 in which one or more radio access nodes serving different cells 50 coordinate their configuration of those cells 50 to protect downlink transmissions in some or all of the relevant cells 50. The techniques illustrated in the example embodiment may be used in conjunction with the uplink redundancy solutions described above or as separate standalone solutions for protecting downlink transmissions.

In the example embodiment, a first radio access node (in this example, low-power node 34x) transmits coordination information to a second access node (here, base station 32z). The configuration information (represented by "configuration information message 80" in FIG. 8) indicates a group of one or more subframes in which low-power node 34x will transmit feedback information to a wireless communication device 20 (here, wireless communication device 20a) in a victim cell served by low-power node 34x (here, cell 50x). Low-power node 34x may transmit the coordination information to base station 32z using a dedicated interface 82 (e.g., an X2 interface) as shown in FIG. 8 or using any suitable direct or indirect connection between the components.

Based on the coordination information, base station 32z determines a second group of one or more time and/or frequency transmission resources to use in an aggressor cell served by base station 32z (here, cell 50z). These time and/or frequency resources (referred to generically in this description as "transmission resources") may represent time resources (e.g., subframes) or frequency resources (e.g., subcarriers) or a combination of both (e.g., use of specific subcarriers during a particular subframe. Base station 32z determines the second group of transmission resources so as to prevent or limit overlap between the second group and the first group. Thus, the second group of transmission resources differs at least in part from the first group. Base station 32z then configures itself to transmit feedback information to one or more wireless communication devices 20 using the second group of transmissions resources.

Depending on the specific embodiment of wireless communication system 10, base station 32z may achieve the configuration in a variety of different ways. In particular embodiments, the configuration process may involve adjusting the time and/or frequency resources used by base station 32z, in general or for certain specific transmissions, in the aggressor cell 50z to ensure that the transmission resources used by base station 32z are not identical in time and frequency with those to be used by low-power node 34x in the victim cell 50x.

In particular embodiments of wireless communication system 10, base station 32z may adjust the transmission resources that base station 32z uses to transmit the same type of downlink transmissions that are to be protected in the victim cell 50x. For instance, in embodiments in which downlink PHICH transmissions are to be protected, base station 32z may adjust parameters associated with base station 32z that affect the transmission resources that base station 32z uses to transmit its own PHICH transmissions. For example, base station 32z may adjust such parameters as a cell identifier associated with base station 32z, a number of modulation symbols (e.g., OFDM symbols in LTE embodiments) used by base station 32z for the relevant transmissions, or a group number (e.g., a PHICH group number) associated with the relevant transmissions in the aggressor cell 50z.

In particular embodiments, base station 32z may adjust the transmission resources used for the relevant transmissions by selecting or reselecting parameters associated with some or all of the wireless communication devices 20 served by the aggressor cell 50z. For example, base station 32z may select or reselect a cyclic shift or resource allocation used by one or more wireless communication device(s) 20 served by the aggressor cell 50z to ensure that the relevant downlink transmissions in the aggressor cell 50z do not use the transmission resources indicated by the receive configuration information. In such cases, base station 32z may transmit information indicating the newly selected parameters to the relevant wireless communication device(s) 20 (e.g., wireless communication device 20y in FIG. 8).

Furthermore, in particular embodiments, base station 32z may also adjust the transmission resources it uses for other types of downlink transmissions that are different from the downlink transmissions to be protected in the victim cell 50x. For example, in embodiments in which PHICH transmissions are to be protected in the victim cell 50x, base station 32z may nonetheless adjust the transmission resources used to transmit other channels, such as the PDCCH, to ensure those channels do not interfere with the protected transmissions. Thus, in such embodiments, base station 32z may select or reselect an identifier assigned to one or more wireless communication devices 20 (e.g., a C-RNTI) served by the aggressor cell 50z, a transmission format for transmissions on the relevant channel (e.g., a number of control channel elements (CCE) to be used), or any other suitable parameter to ensure that the transmission resources used for the relevant downlink transmissions in the aggressor cell 50z do not coincide with the transmission resources identified by the received coordination information.

Depending on the embodiment of wireless communication system 10, base station 32z may initiate the described coordination procedure in a variety of different ways. In particular embodiments, base station 32z may initiate the coordination procedure autonomously (e.g., based on interference measurements in the victim cell 50x), in response to explicit signaling from the other node, based on a predefined rule for coordinating the behavior of radio network nodes, in response to instructions from a coordinating node responsible for coordinating operation of radio access nodes to protect transmissions, and/or as a result of any suitable other triggering event.

Figure 9:
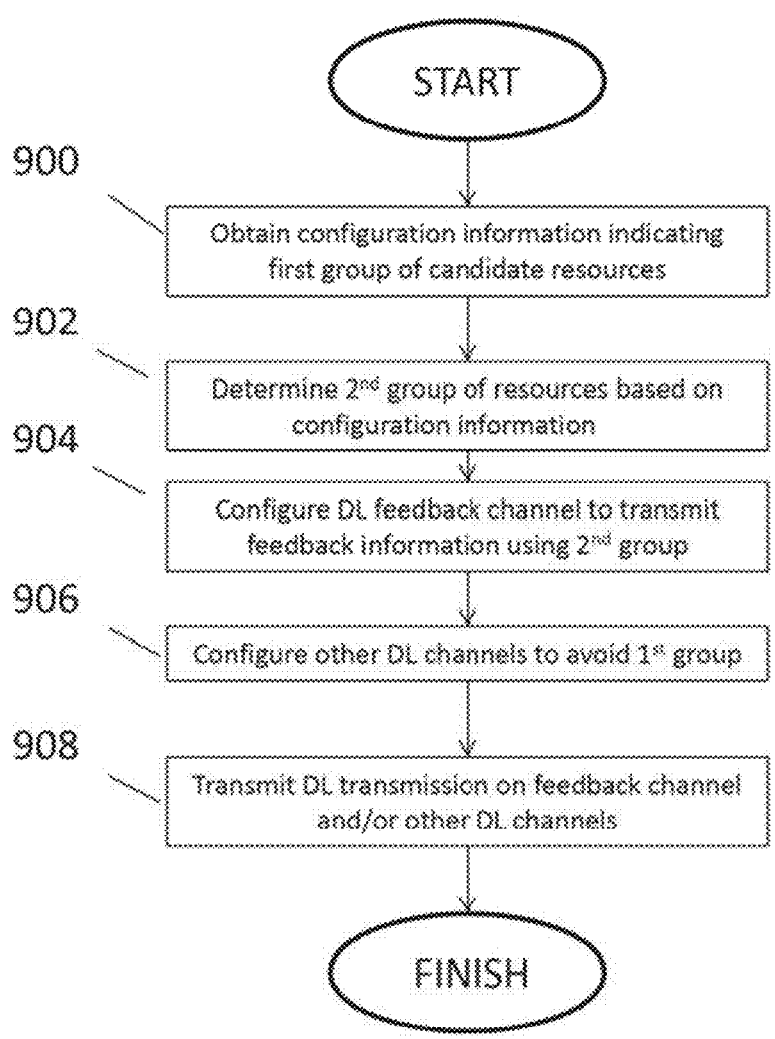
FIG. 9 is a flow chart showing example operation of a particular embodiment of a radio access node in coordinating with another radio access node to protect downlink transmissions.

FIG. 9 is a flow chart illustrating example operation of a radio access node, such as one of the base stations 32 or low-power nodes 34 in FIG. 8, in coordinating configuration with another radio access node to protect downlink transmissions made by one or both of the radio access nodes. The steps illustrated in FIG. 9 may be combined, modified, or deleted where appropriate. Additional steps may also be added to the example operation. Furthermore, the described steps may be performed in any suitable order.

Operation begins in FIG. 9, at step 900, with a radio access node (in this example, base station 32z of FIG. 8) obtaining coordination information indicating a plurality of candidate subframes for downlink transmissions to a wireless communication device 20 in a first cell at step 900. The candidate subframes represent subframes in which another radio access node (in this example, low-power node 34x) will transmit feedback information (e.g., HARQ ACK/NACK bits) to one or more wireless communication devices 20 served by low-power node 34x (in this example, wireless communication device 20x).

Base station 32z then determines based on the obtained coordination information a second group of transmission resources base station 32z should use to transmit feedback information to a wireless communication device 20x served by base station 32z, at step 902. The second group of subframes differs from the first group of subframes.

Base station 32z then proceeds to configure itself to transmit feedback information to a wireless communication device 20 served by base station 32z (e.g., wireless communication device 20y) using the second group of transmission resources at step 904. Base station 32z can configure itself to transmit feedback information using the second group of resources in a variety of ways. As one example, base station 32z may adjust the transmission resources used for the feedback channel by setting a cell identifier for base station 32z. As another example, base station 32z may adjust the transmission resources used for the feedback channel by setting a number of modulation symbols (e.g., OFDM symbols) to be used per subframe by the base station 32z. As another example, base station 32z may adjust the transmission resources used for the feedback channel by setting a group number of wireless communication device 20y. The group number indicates a set of transmission resources used to transmit the feedback information. As yet another example, base station 32z may adjust the transmission resources used for the feedback channel by setting a cyclic shift associated with a demodulation reference signal transmitted by wireless communication device 20y.

In addition to or as an alternative to configuring a downlink feedback channel, such as a PHICH channel, base station 32z may configure other downlink channels to coordinate its downlink transmissions with those of low-power node 34x, at step 906. For example, base station 32z may adjust the transmission resources of a control channel such as the PDCCH by allocating an identifier (e.g., a C-RNTI) for wireless communication device 20y that affects the resource mapping for downlink transmissions to wireless communication device 20y on the relevant channel. As another example, base station 32z may adjust the transmission resources of a control channel such as the PDCCH by adjusting a transmission format for the control channel (e.g., setting a number control channel elements to be used)).

After configuring itself based on the coordination information, base station 32z then transmits downlink transmissions in accordance with the configuration at step 908. As a result of the coordination, the downlink transmissions transmitted by base station 32z will not interfere with the feedback information transmitted by low-power node 34x. Operation of base station 32z with respect to coordinating transmissions with low-power node 34x may then end as shown in FIG. 9.

Figure 10:
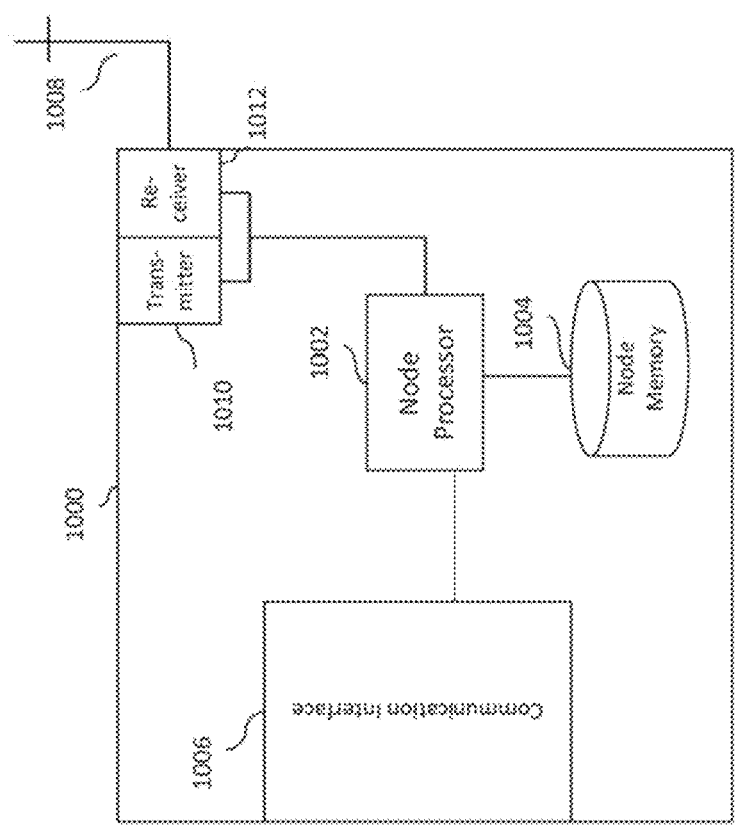
FIG. 10 is a block diagram illustrating the contents of an example embodiment of a radio access node that may be utilized in particular embodiments of the wireless communication system.

FIG. 10 is a block diagram illustrating in greater detail the contents of a particular embodiment of a radio access node 1000 that may be configured to protect downlink transmissions in a cell it is serving (when operating in a potential victim cell) and/or in a nearby cell served by another radio access node (when operating in a potential aggressor cell). Particular embodiments of the example radio access node 1000 may be capable of scheduling redundant uplink transmissions to protect related downlink transmissions as described above, for example, with respect to FIG. 7. Particular embodiments of the example radio access node 1000 may additionally or alternatively be capable of coordinating its downlink transmissions with those of another cell as described above, for example, with respect to FIG. 9. As shown in FIG. 10, the example embodiment of network node 1000 includes a node processor 1002, a node memory 1004, a communication interface 1006, an antenna 1008, a transmitter 1010, and a receiver 1012.

Node processor 1002 may represent or include any form of processing component, including dedicated microprocessors, general-purpose computers, or other forms of electronic circuitry capable of processing electronic information. Examples of node processor 1002 include field-programmable gate arrays (FPGAs), programmable microprocessors, digital signal processors (DSPs), application-specific integrated circuits (ASICs), and any other suitable specific- or general-purpose processors. Although FIG. 10 illustrates, for the sake of simplicity, an embodiment of network node 1000 that includes a single node processor 1002, network node 1000 may include any number of node processors 1002 configured to interoperate in any appropriate manner.

Node memory 1004 stores configuration information obtained by radio access node 1000. Node memory 1004 may also store processor instructions for node processor 1002, coding algorithms, transmission parameters, and/or any other data utilized by radio access node 1000 during operation. Node memory 1004 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 10, node memory 1004 may include one or more physical components local to or remote from radio access node 1000.

Communication interface 1006 comprises electronic circuitry and other components suitable to permit radio access node 1000 to communicate with other radio access nodes and/or other elements of access network 30 and core network 40. For example, in embodiments in which radio access node 1000 exchanges coordination information with other network nodes in access network 30, communication interface 1006 may represent circuitry capable of communicating over an X2 interface between radio access node 1000 and other nodes of access network 30.

Antenna 1008 represents any suitable conductor capable of receiving and transmitting wireless signals. Transmitter 1010 transmits radiofrequency (RF) signals over antenna 1008, and receiver 1012 receives from antenna 1008 RF certain signals transmitted by wireless communication devices 20. Although the example embodiment in FIG. 10 includes certain numbers and configurations of antennas, receivers, and transmitters, alternative embodiments of radio access node 1000 may include any suitable number of these components. Additionally, transmitter 1010, receiver 1012, and/or antenna 1008 may represent, in part or in whole, the same physical components. For example, particular embodiments of radio access node 1000 include a transceiver representing both transmitter 1010 and receiver 1012.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

For the avoidance of doubt, the present invention includes the subject matter as defined in the following numbered paragraphs (abbreviated "para.").

Para. 1. A method for configuring communication in a wireless communication system, the method comprising:

obtaining, at a first network node, information indicating a plurality of candidate subframes for downlink transmissions to a wireless communication device in a first cell served by the first network node, wherein each candidate subframe satisfies a candidate condition that relates to transmissions in a second cell during that subframe;

determining, based on the obtained information, a number of copies of an uplink transmission a wireless communication device should transmit in consecutive uplink subframes so that a downlink transmission related to the uplink transmission will occur during one of the candidate subframes; and configuring the wireless communication device to transmit the determined number of copies of the uplink transmission in consecutive subframes.

Para. 2. The method of para. 1, wherein the candidate condition further relates to an amount of interference that will occur during a respective subframe caused by transmissions in the second cell.

Para. 3. The method of para. 1 further comprising configuring a measurement pattern for the wireless communication device, the measurement pattern indicating one or more subframes in which the related downlink transmission is to be received by the wireless communications device from the first network node, wherein:

the one or more indicated subframes comprise candidate subframes; and the downlink transmission related to the uplink transmission will occur during one or more of the indicated subframes.

Para. 4. The method of para. 1, wherein determining the number of copies the wireless communication device should transmit based on the obtained information comprises:

determining that an interference condition is satisfied, wherein the interference condition relates to an amount of interference experienced by the wireless communication device; and in response to determining that the interference condition is satisfied, determining the number of copies based on the obtained information.

Para. 5. The method of para. 4, wherein the interference condition relates to an interference measurement performed by the first network node or the wireless communication device.

Para. 6. The method of para. 4, wherein the interference condition relates to whether the wireless communication device is located within a cell of a second network node that serves a closed subscriber group to which the wireless device does not belong.

Para. 7. The method of para. 4, wherein the interference condition relates to whether the wireless communication device is operating within a cell range expansion zone of the first cell.

Para. 8. The method of para. 1, wherein the candidate subframes comprise subframes during which the second cell is configured to use Multicast Broadcast Single Frequency Network (MBSFN) Almost Blank Subframes.

Para. 9. The method of para. 1, wherein the downlink transmission comprises feedback information indicating whether the uplink transmission was successfully received.

Para. 10. The method of para. 9, further comprising:

receiving one or more copies of the uplink transmission; and transmitting the downlink transmission during one of the candidate subframes a predetermined amount of time after a last of the one or more copies is received.

Para. 11. The method of para. 1, further comprising transmitting information indicating a candidate subframe to be used for the downlink transmission to a second network node associated with the identified candidate subframe.

Para. 12. The method of para. 1, further comprising scheduling the uplink transmission based on the received information and the determined number of copies so that the downlink transmission will occur in one of the candidate subframes.

Para. 13. The method of para. 1, further comprising transmitting information indicating a capability of the first network node to adaptively use redundant uplink transmissions to align related downlink transmissions with candidate subframes.

Para. 14. An apparatus for configuring communication in a wireless communication system, the apparatus comprising:
 a transmitter configured to transmit configuration information to a wireless communication device; and
 a processor configured to:
  obtain, at a first network node, information indicating a plurality of candidate subframes for a downlink transmission to a wireless communication device in a first cell, wherein each candidate subframe satisfies a predetermined candidate condition that relates to transmissions in a second cell during that subframe;
  determine, based on the obtained information, a number of copies of an uplink transmission a wireless communication device should transmit a wireless communication device should transmit in consecutive uplink subframes so that a downlink transmission related to the uplink transmission will occur during one of the candidate subframes; and
  configure the wireless communication device to transmit the determined number of copies of the uplink transmission in consecutive subframes.

Para. 15. The apparatus of para. 14, wherein the candidate condition further relates to an amount of interference that will occur during a respective subframe caused by transmissions in the second cell.

Para. 16. The apparatus of para. 14, wherein the processor is further configured to transmit a measurement pattern to the wireless communication device, the measurement pattern indicating one or more subframes in which the related downlink transmission is to be received by the wireless communication device from the first network node, wherein
 the one or more indicated subframes comprise candidate subframes; and
 the downlink transmission related to the uplink transmission will occur during one or more of the indicated subframes.

Para. 17. The apparatus of para. 14, wherein the processor is configured to determine the number of copies the wireless communication device should transmit based on the obtained information by:
 determining that an interference condition is satisfied, wherein the interference condition relates to an amount of interference experienced by the wireless communication device; and
 in response to determining that the interference condition is satisfied, determining the number of copies based on the obtained information.

Para. 18. The apparatus of para. 17, wherein the interference condition relates to an interference measurement performed by the first network node or the wireless communication device.

Para. 19. The apparatus of para. 17, wherein the interference condition relates to whether the wireless communication device is located within a cell of a second network node that serves a closed subscriber group to which the wireless device does not belong.

Para. 20. The apparatus of para. 17, wherein the interference condition relates to whether the wireless communication device is operating within a cell range expansion zone of the first cell.

Para. 21. The apparatus of para. 14, wherein the candidate subframes comprise subframes during which the second network cell is configured to use Multicast Broadcast Single Frequency Network (MBSFN) Almost Blank Subframes.

Para. 22. The apparatus of para. 14, wherein the downlink transmission comprises feedback information indicating whether the uplink transmission was successfully received.

Para. 23. The apparatus of para. 22, wherein the processor is further configured to:
 receive one or more copies of the uplink transmission; and
 transmit the downlink transmission during one of the candidate subframes a predetermined amount of time after a last of the one or more copies is received.

Para. 24. The apparatus of para. 14, wherein the processor is further configured to transmit information indicating a candidate subframe to be used for the downlink transmission to a second network node associated with the identified candidate subframe.

Para. 25. The apparatus of para. 14, wherein the processor is further configured to schedule the uplink transmission based on the received information and the determined number of copies so that the downlink transmission will occur in one of the candidate subframes.

Para. 26. The apparatus of para. 14, wherein the processor is further configured to transmit information indicating a capability to adaptively use redundant uplink transmissions to align related downlink transmissions with candidate subframes.

Para. 27. A method for configuring communication in a wireless communication system, the method comprising:
 obtaining information indicating a first group of one or more subframes of a radio frame in which a first network node will transmit feedback information to one or more wireless communication devices served by the first network node;
 determining, based on the obtained information, a second group of one or more subframes in which a second network node should transmit feedback information to one or more wireless communication devices served by the second network node, wherein the second group of subframes differs from the first group of subframes;
 configuring the second network node to transmit feedback information to one or more wireless communication devices during the second group of subframes; and
 transmitting feedback information from the first network node during the second group of subframes.

Para. 28. The method of para. 27, wherein the information indicating the first group and the second group of one or more subframes is obtained by explicit signaling from another node, based on a pre-defined rule for coordinating behavior of radio network nodes, in response to instructions from a coordinating node responsible for coordinating operation of radio access nodes to protect transmissions.

Para. 29. The method of para. 27, wherein configuring the second network node to transmit feedback information during the second group of subframes comprises adjusting time and/or frequency resources of a feedback channel transmitted by the second network node by setting a cell identifier for the second network node.

Para. 30. The method of para. 27, wherein configuring the second network node to transmit feedback information during the second group of subframes comprises adjusting time and/or frequency resources of a feedback channel transmitted by the second network node by setting a number of orthogonal frequency division modulation symbols (OFDM) symbols to be used per subframe by the second network node.

Para. 31. The method of para. 27, further comprising adjusting time and/or frequency resources of a control channel transmitted by the second network node by allocating an identifier to a wireless communication device served by the second network node.

Para. 32. The method of para. 27, further comprising adjusting a control channel transmitted by the second node by adjusting a transmission format for the control channel.

Para. 33. The method of para. 27, wherein configuring the second network node to transmit feedback information during the second group of subframes comprises adjusting a group number of a wireless communication device served by the second network node, wherein the group number indicates a set of transmission resources used to transmit the feedback information.

Para. 34. The method of para. 27, wherein configuring the second network node to transmit feedback information during the second group of subframes comprises adjusting a feedback channel transmitted by the second network node by setting a cyclic shift associated with a demodulation reference signal transmitted by a wireless communication device served by the second network node.

Para. 35. The method of para. 27, wherein the second group of subframes comprise almost blank subframes (ABS).

Para. 36. The method of para. 27, wherein transmitting feedback information comprises transmitting Hybrid-Automatic Repeat Request (HARQ) feedback on a Physical HARQ Indicator Channel (PHICH).

Para. 37. An apparatus for configuring communication in a wireless communication system, the apparatus comprising:
a transmitter adapted to transmit feedback information to a wireless communication device; and
a processor adapted to:
obtain information indicating a first group of one or more subframes of a radio frame in which a first network node will transmit feedback information to one or more wireless communication devices served by the first network node;
determine, based on the obtained information, a second group of one or more subframes in which a second network node should transmit feedback information to one or more wireless communication devices served by the second network node, wherein the second group of subframes differs from the first group of subframes;
configure the second network node to transmit feedback information to one or more wireless communication devices during the second group of subframes; and
transmit feedback information from the first network node during the second group of subframes.

Para. 38. The apparatus of para. 37, wherein the processor is operable to obtain the information indicating the first group and the second group of one or more subframes by explicit signaling from another node, based on a pre-defined rule for coordinating behavior of radio network nodes, in response to instructions from a coordinating node responsible for coordinating operation of radio access nodes to protect transmissions.

Para. 39. The apparatus of para. 37, wherein the processor is adapted to configure the second network node to transmit feedback information during the second group of subframes by setting a cell identifier for the second network node.

Para. 40. The apparatus of para. 37, wherein the processor is adapted to configure the second network node to transmit feedback information during the second group of subframes by setting a number of orthogonal frequency division modulation symbols (OFDM) symbols to be used per subframe by the second network node.

Para. 41. The apparatus of para. 37, wherein the processor is further adapted to adjust a timing of a control channel transmitted by the second network node by allocating an identifier to a wireless communication device served by the second network node.

Para. 42. The apparatus of para. 37, wherein the processor is further adapted to adjust a timing of a control channel transmitted by the second node by adjusting a transmission format for the control channel.

Para. 43. The apparatus of para. 37, wherein the processor is adapted to configure the second network node to transmit feedback information during the second group of subframes by adjusting a group number of a wireless communication device served by the second network node, wherein the group number indicates a set of transmission resources used to transmit the feedback information.

Para. 44. The apparatus of para. 37, wherein the processor is adapted to configure the second network node to transmit feedback information during the second group of subframes by setting a cyclic shift associated with a demodulation reference signal transmitted by a wireless communication device served by the second network node.

Para. 45. The apparatus of para. 37, wherein the second group of subframes comprise almost blank subframes (ABS).

Para. 46. The apparatus of para. 37, wherein the processor is operable to transmit feedback information by transmitting Hybrid-Automatic Repeat Request (HARQ) feedback on a Physical HARQ Indicator Channel (PHICH).

What is claimed is:

1. A method for configuring communication in a wireless communication system, the method comprising:
obtaining information indicating a first group of one or more subframes of a radio frame in which a first network node will transmit feedback information to one or more wireless communication devices served by the first network node;
determining, based on the obtained information, a second group of one or more subframes in which a second network node should transmit feedback information to one or more wireless communication devices served by the second network node, wherein the second group of subframes differs from the first group of subframes;
configuring the second network node to transmit feedback information to one or more wireless communication devices during the second group of subframes; and
transmitting feedback information from the second network node during the second group of subframes,
wherein configuring the second network node to transmit feedback information during the second group of subframes comprises one of:
adjusting time and/or frequency resources of a feedback channel transmitted by the second network node by setting a cell identifier for the second network node or setting a number of orthogonal frequency division modulation symbols (OFDM) symbols to be used per subframe by the second network node, adjusting a group number of a wireless communication device served by the second network node, wherein the group number indicates a set of transmission resources used to transmit the feedback information, or adjusting a feedback channel transmitted by the second network node by setting a cyclic shift associated with a demodulation reference signal transmitted by a wireless communication device served by the second network node.

2. The method of claim 1, wherein the information indicating the first group of one or more subframes is obtained by explicit signaling from another node, based on a pre-defined rule for coordinating behavior of radio network nodes, and/or in response to instructions from a coordinating node responsible for coordinating operation of radio access nodes to protect transmissions.

3. The method of claim 1, further comprising adjusting time and/or frequency resources of a control channel transmitted by the second network node by allocating an identifier to a wireless communication device served by the second network node.

4. The method of claim 1, further comprising adjusting a control channel transmitted by the second node by adjusting a transmission format for the control channel.

5. The method of claim 1, wherein the second group of subframes comprise almost blank subframes, ABS.

6. The method of claim 1, wherein transmitting feedback information comprises transmitting Hybrid-Automatic Repeat Request, HARQ, feedback on a Physical HARQ Indicator Channel, PHICH.

7. An apparatus for configuring communication in a wireless communication system, the apparatus comprising:
   a transmitter adapted to transmit feedback information to a wireless communication device; and
   a processor adapted to:
      obtain information indicating a first group of one or more subframes of a radio frame in which a first network node will transmit feedback information to one or more wireless communication devices served by the first network node;
      determine, based on the obtained information, a second group of one or more subframes in which a second network node should transmit feedback information to one or more wireless communication devices served by the second network node, wherein the second group of subframes differs from the first group of subframes;
      configure the second network node to transmit feedback information to one or more wireless communication devices during the second group of subframes; and
      transmit feedback information from the second network node during the second group of subframes,
   wherein the processor is adapted to configure the second network node to transmit feedback information during the second group of subframes by one of:
      adjusting time and/or frequency resources of a feedback channel transmitted by the second network node by setting a cell identifier for the second network node or setting a number of orthogonal frequency division modulation symbols (OFDM) symbols to be used per subframe by the second network node,
      adjusting a group number of a wireless communication device served by the second network node, wherein the group number indicates a set of transmission resources used to transmit the feedback information, or
      adjusting a feedback channel transmitted by the second network node by setting a cyclic shift associated with a demodulation reference signal transmitted by a wireless communication device served by the second network node.

8. The apparatus of claim 7, wherein the processor is operable to obtain the information indicating the first group of one or more subframes by explicit signaling from another node, based on a pre-defined rule for coordinating behavior of radio network nodes, and/or in response to instructions from a coordinating node responsible for coordinating operation of radio access nodes to protect transmissions.

9. The apparatus of claim 7, wherein the processor is further adapted to adjust a timing of a control channel transmitted by the second network node by:
   allocating an identifier to a wireless communication device served by the second network node; or
   adjusting a transmission format for the control channel.

10. The apparatus of claim 7, wherein the second group of subframes comprise almost blank subframes, ABS.

11. The apparatus of claim 7, wherein the processor is operable to transmit feedback information by transmitting Hybrid-Automatic Repeat Request, HARQ, feedback on a Physical HARQ Indicator Channel, PHICH.

\* \* \* \* \*